United States Patent [19]

Lucas

[11] 4,312,050
[45] Jan. 19, 1982

[54] MULTIDIMENSIONAL AMPLITUDE SCALING OF SEISMIC DATA

[75] Inventor: Robert C. Lucas, Tulsa, Okla.

[73] Assignee: Standard Oil Company (Indiana), Chicago, Ill.

[21] Appl. No.: 64,168

[22] Filed: Aug. 6, 1979

Related U.S. Application Data

[63] Continuation of Ser. No. 547,536, Feb. 6, 1975, abandoned.

[51] Int. Cl.³ .............................................. G01V 1/28
[52] U.S. Cl. ...................................... 367/44; 367/43; 367/47
[58] Field of Search ...................... 367/37, 44, 45, 47, 367/48, 49

[56] References Cited

U.S. PATENT DOCUMENTS

| | | |
|---|---|---|
| 3,150,327 | 9/1964 | Taylor . |
| 3,284,763 | 11/1966 | Burg et al. . |
| 3,287,695 | 11/1966 | Taylor . |
| 3,419,853 | 12/1968 | Silverman . |
| 3,421,141 | 1/1969 | Meyerhoff . |
| 3,671,930 | 6/1972 | Mateker, Jr. .................. 367/47 |
| 3,715,715 | 2/1973 | Ruehle ................................. 367/47 |

*Primary Examiner*—Howard A. Birmiel

[57] ABSTRACT

An apparatus and method for improving seismic resolution involving the application of scaling factors to seismic data which compensate for amplitude decay as a function of time, frequency and source-to-receiver distance (position). Each seismic trace associated with a common source-to-receiver distance is first separated into a plurality of frequency band-limited component traces. A time-variant amplitude scale factor (or its equivalent) is generated for each component trace. These scale factors are then applied to the component trace thus compensating for amplitude decay of the component trace. Upon recombination of the component traces a multidimensional amplitude scaled (MIDAS) seismic trace is recovered. The apparatus and method are particularly useful in creating a high-frequency extension of the frequency bandwidth resulting in improved resolution upon further processing or display. The method can be implemented as part of the field procedure or during subsequent computer processing.

17 Claims, 13 Drawing Figures

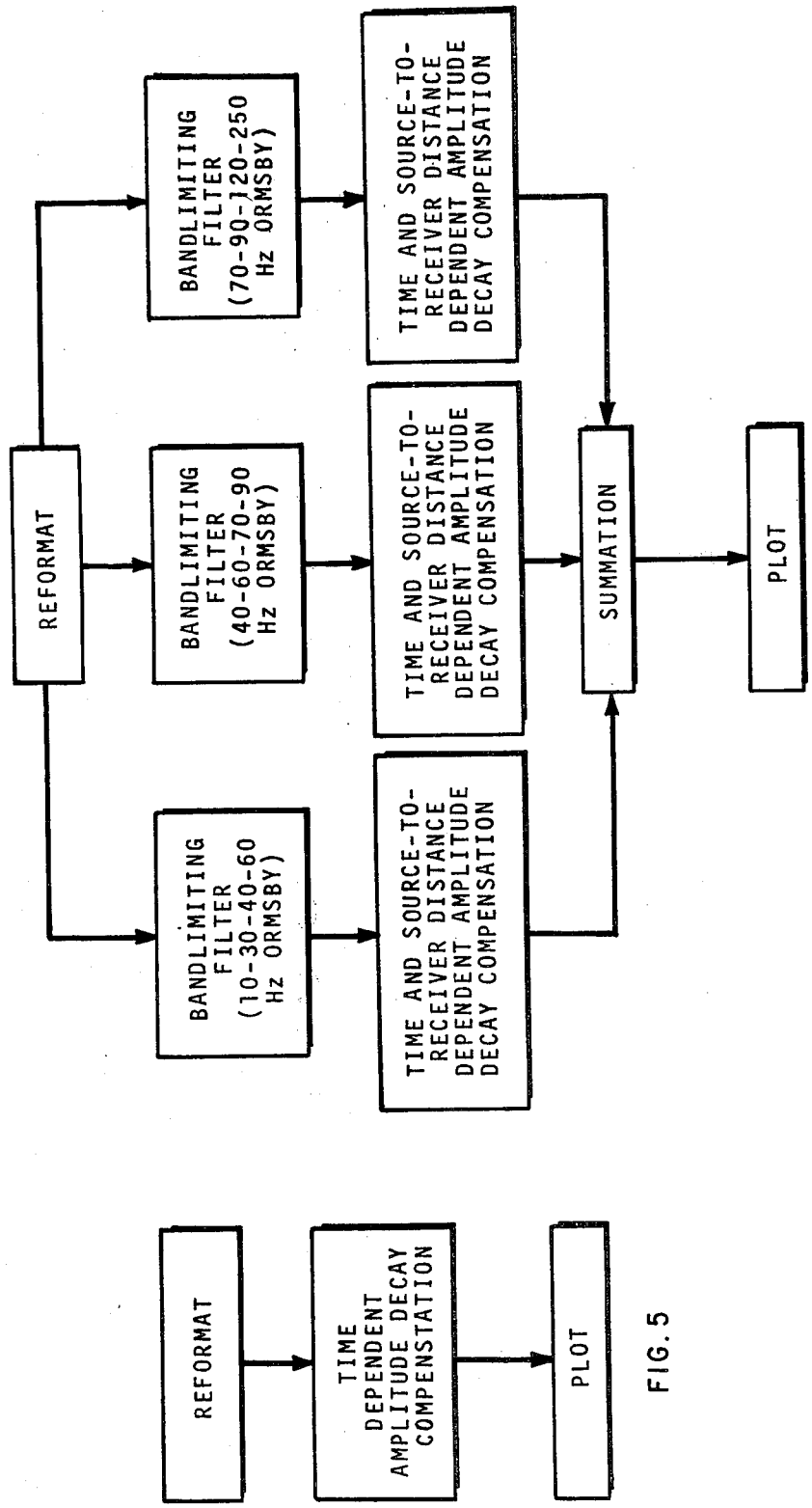

MULTIDIMENSIONAL AMPLITUDE SCALING OF SEISMIC DATA

This is a continuation of application Ser. No. 547,536, filed Feb. 6, 1975, now abandoned.

BACKGROUND OF THE INVENTION

1. Field of the Invention

This invention relates to the field of seismology and in particular to the processing of seismic reflection data to render them more useful in interpreting the geophysical characteristics of the earth. Specifically, this disclosure involves a new method and apparatus for multidimensional amplitude scaling of seismic traces such that further processing and/or displaying of the traces will result in a seismic section of improved resolution.

2. Description of the Prior Art

It is well known and documented that during the course of a seismic survey, such as the mapping of geological structures by creating seismic waves and observing the arrival times of the waves reflected from acoustic-impedance contrasts or refracted through high-velocity members, the amplitude of a seismic signal decays as it propagates through the earth. Further, this amplitude decay will be frequency dependent in that the higher frequency components tend to suffer greater amplitude attenuation particularly at later arrival times. Generally several factors are viewed as contributing to the amplitude attenuation such as geometrical spreading, reflection absorption, scattering and various other transmission loss mechanisms.

This amplitude decay typically has been compensated for by application of an inverse gain correction in the form of a programmed gain curve, automatic gain control circuit, or other similar method. Such methods correct for amplitude decay as a function of time over the time span of the seismic trace by systematically amplifying the later arriving signals. Additionally, a family of gain corrections keyed to the source-to-receiver distance are sometimes applied, resulting in a scaling as a function of time and position. However, this amplitude scaling, intended to compensate for signal attenuation, historically has been performed independent of frequency; the seismic trace is not resolved into frequency components but scaled as a whole by a single inverse gain curve.

Although it is recognized that amplitude attenuation occurs as a function of frequency as well as other variables, very little has been published as to various possible methods and criteria of accounting for and correcting for the signal decay as a function of frequency. One exception to this is found in U.S. Pat. No. 3,327,805 Glazier et al. A system for processing seismic signals is described and claimed involving separation of a seismic reflection signal created by a seismic disturbance of known amplitude vs. frequency spectrum into a series of one cycle per second wide frequency bands. In the process of separating into narrow frequency bands the amplitudes are adjusted to a constant value. These components are then weighted and recombined such that the recombination has the same frequency force spectrum as did the known seismic disturbance. Thus, the frequency spectrum is normalized in the sense that the amplitude as a function of frequency is restored to the same relative value as that of the original seismic disturbance. The advantage of this process lies in the selective removal of the unwanted lower frequencies containing surface noise and ground roll. One of the disadvantages of this process is that the high frequency components which are to be amplified have relatively unfavorable signal-to-noise ratios, thus selective amplification actually introduces background noise at the high frequencies. Hence, the process is useful only over a rather narrow frequency range.

In U.S. Pat. No. 3,454,924 by Sherwood et al the problem of introducing high frequency noise was explicitly recognized. The upper frequency limits for their adaptive gain control process were identified as 50 cycles per second for the early part of the seismic trace and about 35 cycles per second for later times. Sherwood et al proposed that beyond these limits the high frequency content should be made to decline. In contrast, the present invention explicitly involves the amplification of the high frequency components over a frequency range well in excess of the upper limits suggested by Sherwood et al. This is a direct contradiction of what the cited art is suggesting with respect to the presence of high frequency noise.

Additionally, Sherwood et al essentially ignores the significance of zero-phase filtering while Glazier et al recognizes the desirability of no phase distortion, but bypasses the problem in a manner which is inconsistent with the multidimensional amplitude scaling of the present invention. Specifically, Glazier et al simulates zero-phase filtering by separating the seismic signal into very narrow frequency bandpasses. By using essentially 1 Hz bandwidths the filter will appear to be approximately linear across this frequency range independent of which frequency is to be passed. Thus, by making independent static time corrections on each of these bandpasses, the overall zero-phase filtering is simulated. However, approximating zero-phase filtering by separating the seismic trace into frequency bandwidths of 5 Hz or less is deleterious to the desired improved resolution of present invention even if this filter in fact is zero-phase-shift.

Such processes as described by Glazier et al and Sherwood et al have historically been viewed as methods of selectively biasing certain undesirable low frequency noises, particularly ground roll. Hence the term "automatic spectrum whitening" has been used to describe these processes as witnessed in U.S. Pat. No. 3,812,457 by Weller. However, the spectrum whitening of the present invention is a far more sophisticated concept than that of this prior art. The spectral amplitude flattening by selective removal of undesired frequency components within the classical seismic frequency range is not the same as the multidimensional amplitude scaling of the present disclosure. It is the contention of present application that the combination of spectral amplitude flattening and broadening to high frequencies both being performed under a zero-phase-shift constraint results in a type of whitening that has inherent wave compression and deconvolution aspects. Consequently, this leads to improved resolution without destroying coherency between events on adjacent seismic traces. It is interesting to note that in Weller's patent the time dependency of amplitude attenuation has to be completely ignored and the cited art should be viewed as teaching amplitude-frequency scaling independent of time because Weller does not use a seismic source signal but rather makes a purely random noise observation, further indicating that the art does not fully recognize how significant a tool proper multidimensional amplitude scaling can be.

Another method of recognizing amplitude decay as a function of time and frequency which leads to an alternate basis for correcting for attenuation is to perform a Fourier analysis of the seismic data and view the phenomenon in a frequency domain. In particular it is observed that the frequency content along the length of the record will shift to lower frequencies as the time increases. This corresponds to the previous interpretation that higher frequency seismic signals are attenuated at a faster rate than lower frequency seismic signals. Thus, the earlier recorded seismic reflections, which represent the shallow subsurface formations, have a higher mean frequency than the later recorded seismic reflections which represent the deep surface formations.

The recognition of this shift in the center frequency as a function of time led to the proposal in U.S. Pat. No. 3,281,776 by Ruehle that in processing seismic data one should employ a time-domain filter comprising a plurality of heads spaced one from the other with means to cause the heads to move continuously to effect filters of different bandpass. Later, in U.S. Pat. No. 3,716,829 again by Ruehle a computer performed method is disclosed which quantitatively uses the center frequencies along a seismic trace to create a frequency shift which supposedly accounts for attenuation of high frequency reflections. In both of these methods the information or knowledge which is introduced at the high frequencies to compensate for the attenuation does not correspond to the information which was originally characteristic of that frequency. In contrast, direct multidimensional amplitude scaling in the time domain preserves the integrity of the information as a function of frequency.

Still other methods have been proposed for compensating for distortion and thus creating wide band representation involving processes that are less than multidimensional scaling. For example in U.S. Pat. No. 3,715,715 by Ruehle a computer performed method for obtaining a wide band representation is claimed. This method involves calculating a mean spectral amplitude for successive Fourier analyses of successive truncations of the seismic trace to obtain an average amplitude as a function of time. This average amplitude function is then used in an inverse filtering process as described in U.S. Pat. No. 3,275,980 by Foster. Again, the correction is made essentially independent of frequency and amounts to a computerized version of the gain curve techniques known in the art.

Additionally, other techniques are known involving narrow frequency bands but for purposes other than correcting for amplitude attenuation. See for example U.S. Pat. Nos. 3,259,878 and 3,349,860 by Mifsud. In U.S. Pat. No. 3,259,878 a set of elemental signals each having narrow frequency bands is used individually as a seismic source creating a set of received signals characteristic of the respective frequencies. A total source signal having the desired frequency spectrum is then synthesized by first adjusting the element source signals in terms of both relative phase and amplitude and then summing them together. Having thus determined the adjustments required to create the desired total source signal these same adjustments are then applied to the respective received signals and summed together to yield a total received signal. This total signal can then be processed as a seismic trace in manners known to the art. However, there is no suggestion or criterion set forth that would account for amplitude attenuation during the adjusting procedure. In U.S. Pat. No. 3,349,860 a process is described wherein subsets of individual detectors within a group are assigned narrow frequency ranges and specific geometrical locations for the purpose of achieving the same directivity pattern for all frequencies. Again no attempt is made to correct for amplitude attenuation. In fact in U.S. Pat. No. 3,292,143 by Russell amplitude decay as a function of frequency and time is recognized without attempting to make any scaling of the trace. Instead the change in relative frequency content during seismic exploration is utilized to identify the rock formation.

Frequency dependent absorption with depth (i.e., time of arrival) not ony creates problems in interpreting observed seismic reflections but also has an analogous influence when one attempts to construct "a priori" a synthetic seismogram. For a theoretical discussion of the effect of frequency and depth dependent absorption when building a theoretical seismogram see "Theoretical Seismograms with Frequency and Depth Dependent Absorption" by A. W. Trovey in Geophysics, Vol. 27, p. 766–785 (1962). In this article it is concluded that a time-domain calculation is preferred in that a solution by Fourier Transform in the frequency domain would lead to the introduction of significant error.

SUMMARY OF THE INVENTION

In the process of detecting and recording seismic energy, two octaves are considered to be the minimum bandwidth necessary for a pulse shape which does not exhibit excessive ringing characteristics. As the two-octave bandwidth is broadened and/or is moved to higher frequencies, resolution of reflections and definition of the subsurface features improves. In view of these empirically derived rules-of-thumb and for purposes of this invention any improvement which results in a high frequency extension of the frequency bandwidth by at least one octave above that obtained by conventional methods is considered a significant improvement in resolution and is termed "high resolution." Thus, the primary object of this invention is to develop an improved high resolution seismic exploration method.

In accordance with the primary object of the present invention, I have discovered a method and apparatus for preparing a high resolution seismogram wherein the improvement involves specific seismic data acquisition and subsequent specific processing of that seismic data. In the most general application of my invention, data acquisition comprises detecting and recording seismic data as a function of time over a frequency range of at least 20 to 100 Hz with a large dynamic range and the data processing comprises multidimensional amplitude scaling of seismic data performed in the time-domain herein referred to as "MIDAS".

One aspect of this invention is that the seismic data are detected and recorded with a sufficiently large dynamic range such that any band-limited noise (usually low frequency surface wave energy) does not represent an overriding signal consuming the dynamic range of the recording system. In one embodiment of this aspect a seismic trace spanning the entire frequency range and time of interest is recorded in a manner such that relative discrimination between the high intensity low frequency energy and the low intensity high frequency energy exceeding a spectral amplitude range of at least 60 db (based on relative amplitudes of the frequency components of the signal) is preserved in the record. In another embodiment of this aspect, the improved dynamic range is achieved by using more than one detector (geophone, hydrophone, etc.) or groups of detectors each dedicated to a specific frequency band or alternatively using one detector or group of detectors and splitting the signal output into parallel channels, each of which will be dedicated to a specific frequency band. Each frequency band will be recorded separately. Thus, the low-frequency high-energy band will be digitized and recorded as usual. The next higher frequency band will be prefiltered (low-cut) prior to amplification and digitization to effectively remove the high energy associated with the previous lower frequency band. Each subsequent higher frequency band will similarly be prefiltered to remove the sum of all previously lower frequency higher energy bands. In this manner each frequency band can be amplified and digitized separately to individually utilize the full dynamic range of the recording system as well as more effectively avoid any loss of dynamic range associated with the choice of quantization unit and number of bits used in the digital conversion. Digital high-cut filtering performed later (with additional low-cut and further frequency separation if desired) will result in an overall improved effective dynamic range. This embodiment is particularly useful in that it allows greater flexibility in the choice of field techniques used to optimize the detection and recording on a per frequency band basis; such as, choice of seismometers according to their respective responses, choice of array designs according to their respective noise cancellation, choice of filters in the amplifier, choice and control of seismic energy source or any combination of these. Specifically, this embodiment allows the use of large dynamite charges which leads to improved signal-to-noise ratio by directly increasing the signal, as well as the Vibroseis counterpart.

Another aspect of this invention is that the multidimensional amplitude scaling of the seismic data compensates for signal attenuation to varying degrees at different source-to-receiver distances, frequencies and time of arrival. In the most general embodiment of this aspect a seismic trace is separated into a plurality of frequency band-limited component traces, a time-variant amplitude scale factor for each component trace is established, amplitude decay is then compensated for on a component trace basis by applying the respective scale factor and the scaled component traces are recombined thus recovering a multidimensional amplitude scaled seismic trace.

In one specific embodiment of this invention, means for accomplishing both aspects are provided for by dedicated equipment in the field while in another specific embodiment the data processing aspects are performed on a general purpose digital computer after data acquisition in the field. In still another specific embodiment, a portion of the data processing aspect such as frequency separation with or without prefiltering is performed in the field and the subsequent steps are performed by the computer. Still other aspects of this invention involve accounting for signal decay as a function of the source-to-receiver distance by performing the multidimensional amplitude scaling per individual source to geophone recording, per group of single source location to set of essentially equivalent geophone locations or per group of sets of essentially identical source location to geophone location distances. Other aspects and embodiments of this invention will be apparent to one skilled in the art upon complete reading of the specification and example.

BRIEF DESCRIPTION OF THE DRAWING

FIG. 1 is a representation of an input seismic trace (recorded at an arbitrary, but unique, source-to-receiver distance) before separation into component frequency bands.

FIG. 2 is a representation of the seismic trace after separation into component frequency bands to empirically determine amplitude decay in time along the trace and to apply scale factors which compensate for the decay as it was observed in each frequency band and for all traces recorded at this source-to-receiver distance.

FIG. 3 is a representation of the seismic trace after scaling to compensate for the observed amplitude decay.

FIG. 4 is a representation of the output seismic trace after summation of individually scaled component frequency bands.

FIG. 5 and FIG. 6 are flow charts of computer programs showing the generalized sequence followed to digitally process seismic data for the purpose of amplitude scaling.

FIG. 5 is a flow chart for conventional single-dimensional amplitude scaling.

FIG. 6 is a flow chart for the multidimensional amplitude scaling (MIDAS).

FIG. 7 is a seismogram section of the data after application of conventional single-dimensional amplitude scaling.

FIG. 8 is a seismogram section of the data after filtering with a 10-30-40-60 Hz Ormsby filter and subsequent time and source-to-receiver distance dependent amplitude decay compensation.

FIG. 9 is a seismogram section of the data after filtering with a 40-60-70-90 Hz Ormsby filter and subsequent time and source-to-receiver distance dependent amplitude decay compensation.

FIG. 10 is a seismogram section of the data after filtering with a 70-90-120-250 Hz Ormsby filter and subsequent time and source-to-receiver distance dependent amplitude decay compensation.

FIG. 11 is a seismogram section of the data with MIDAS applied.

DESCRIPTION OF THE PREFERRED EMBODIMENTS

Figure 1:
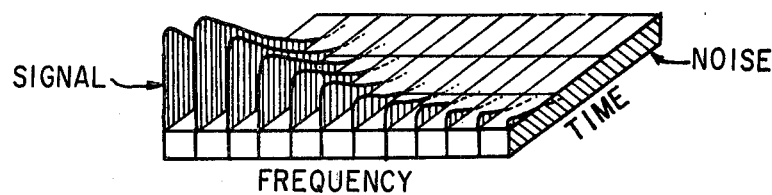
FIG. 1 through FIG. 4 are diagrammatic displays depicting the computerized processing sequence used to apply multidimensional amplitude scaling to seismic data.
Figure 2:
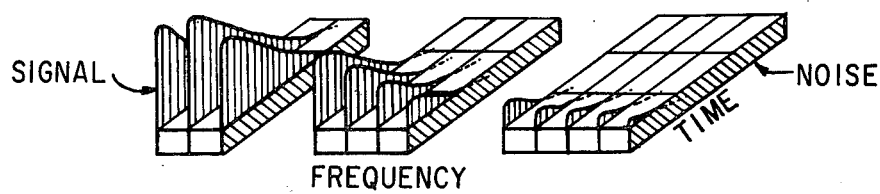
Figure 3:
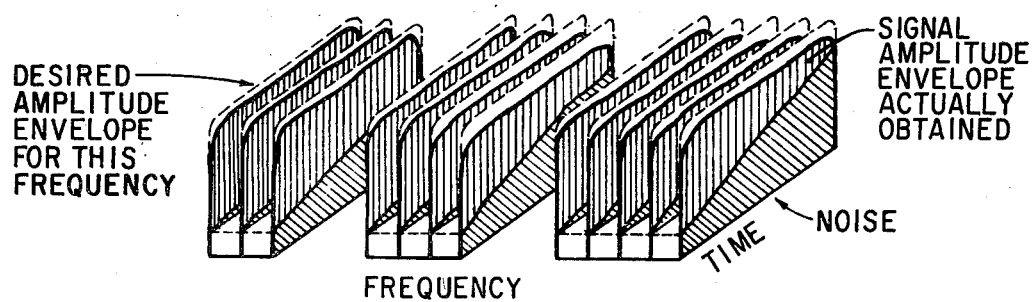
Figure 4:
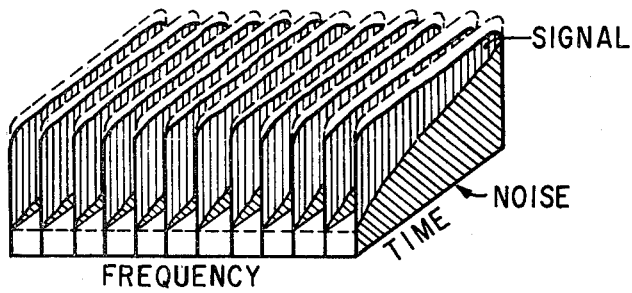
Figure 7:
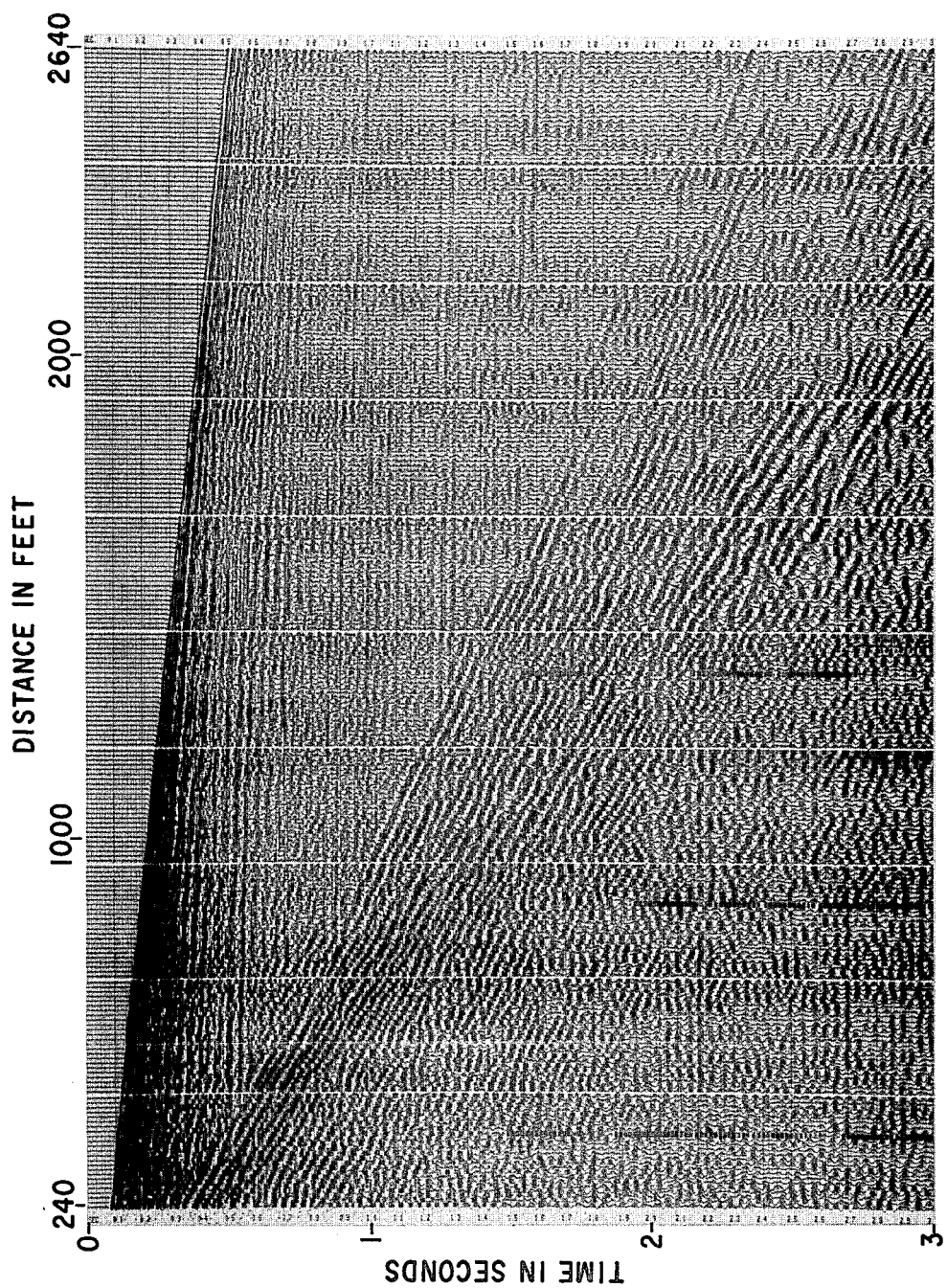
FIG. 7 through FIG. 11 are seismogram sections derived from the same real seismic data after being subjected to various data processing steps.
Figure 8:
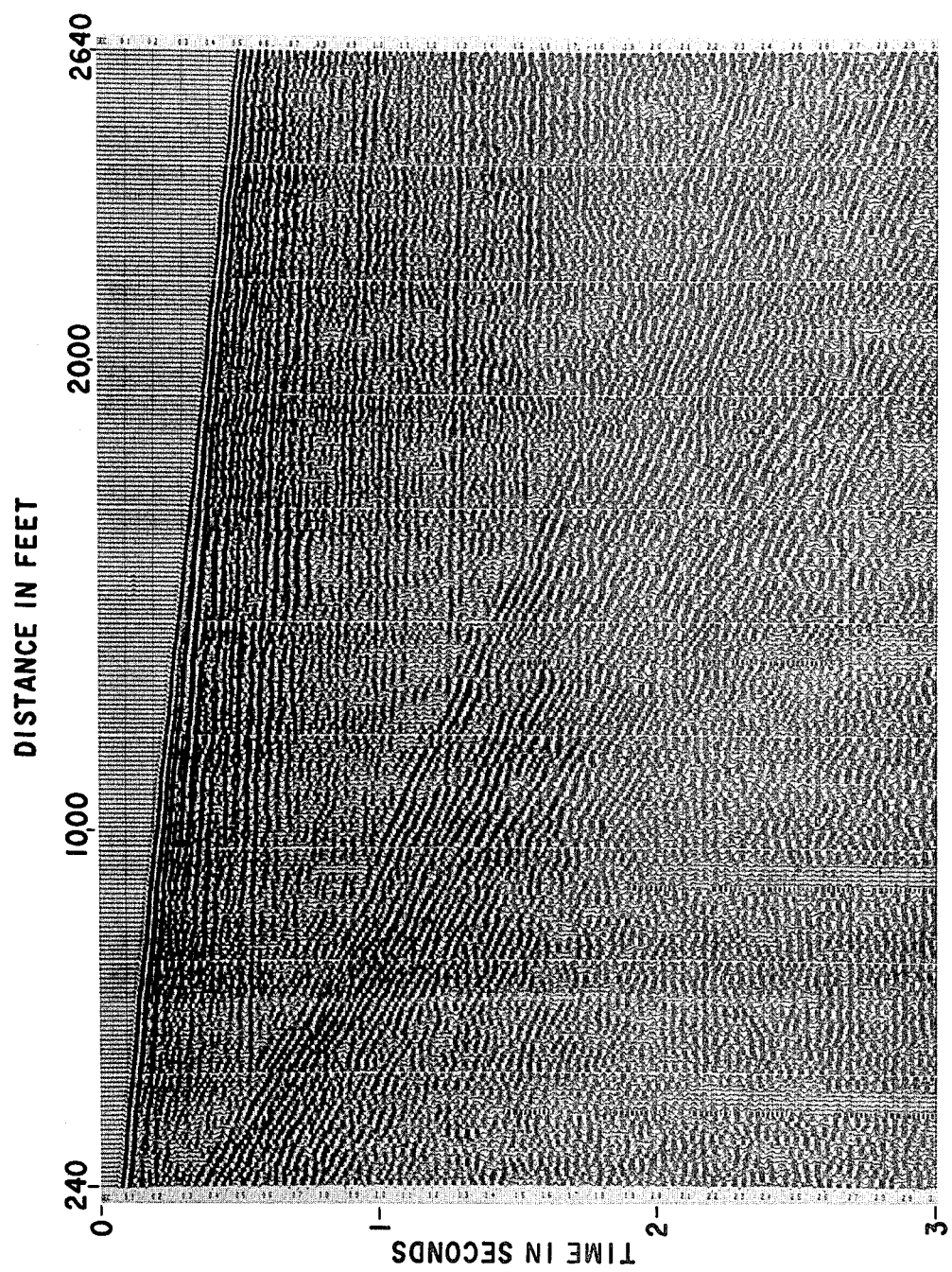
Figure 9:
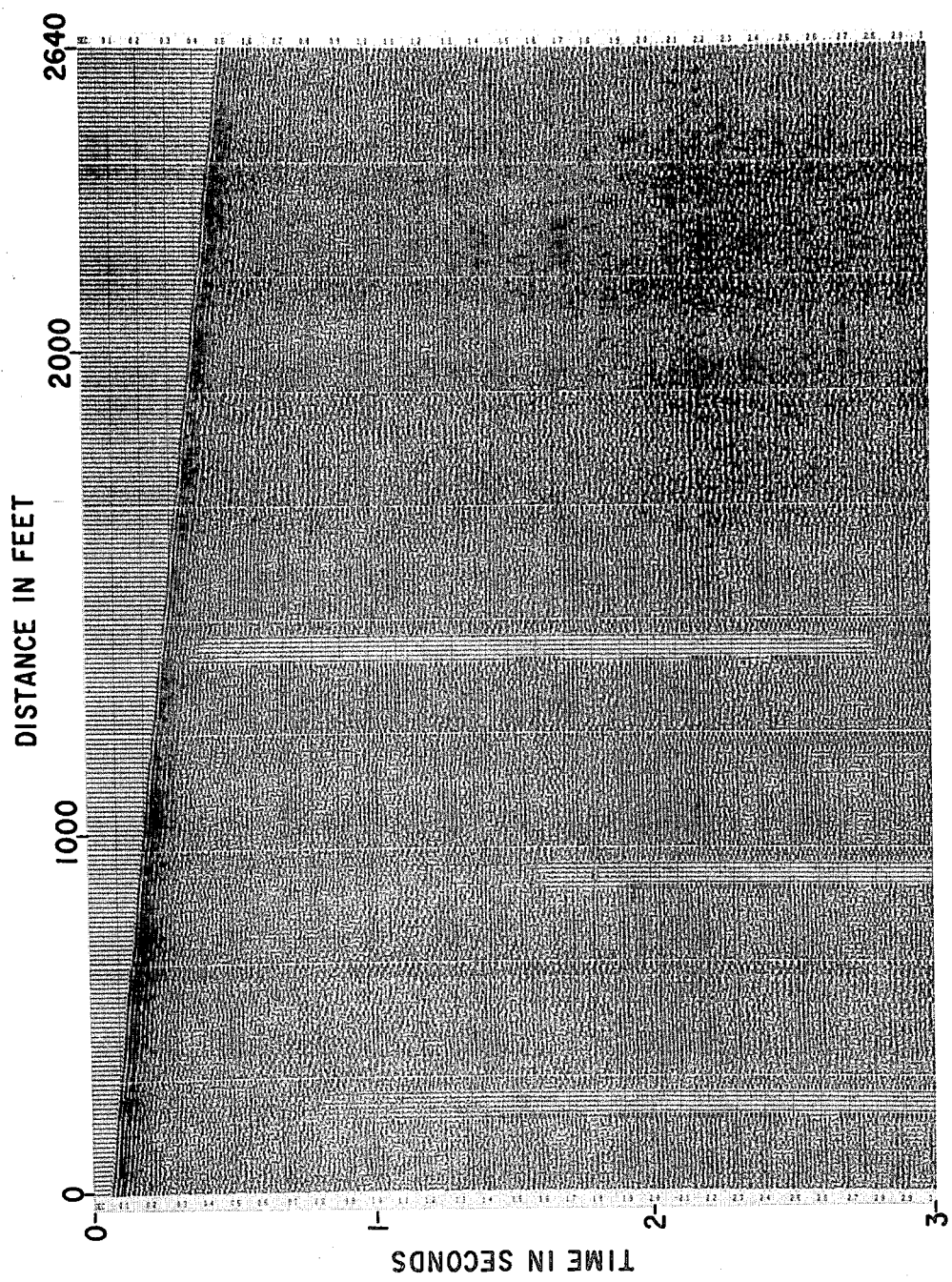
Figure 10:
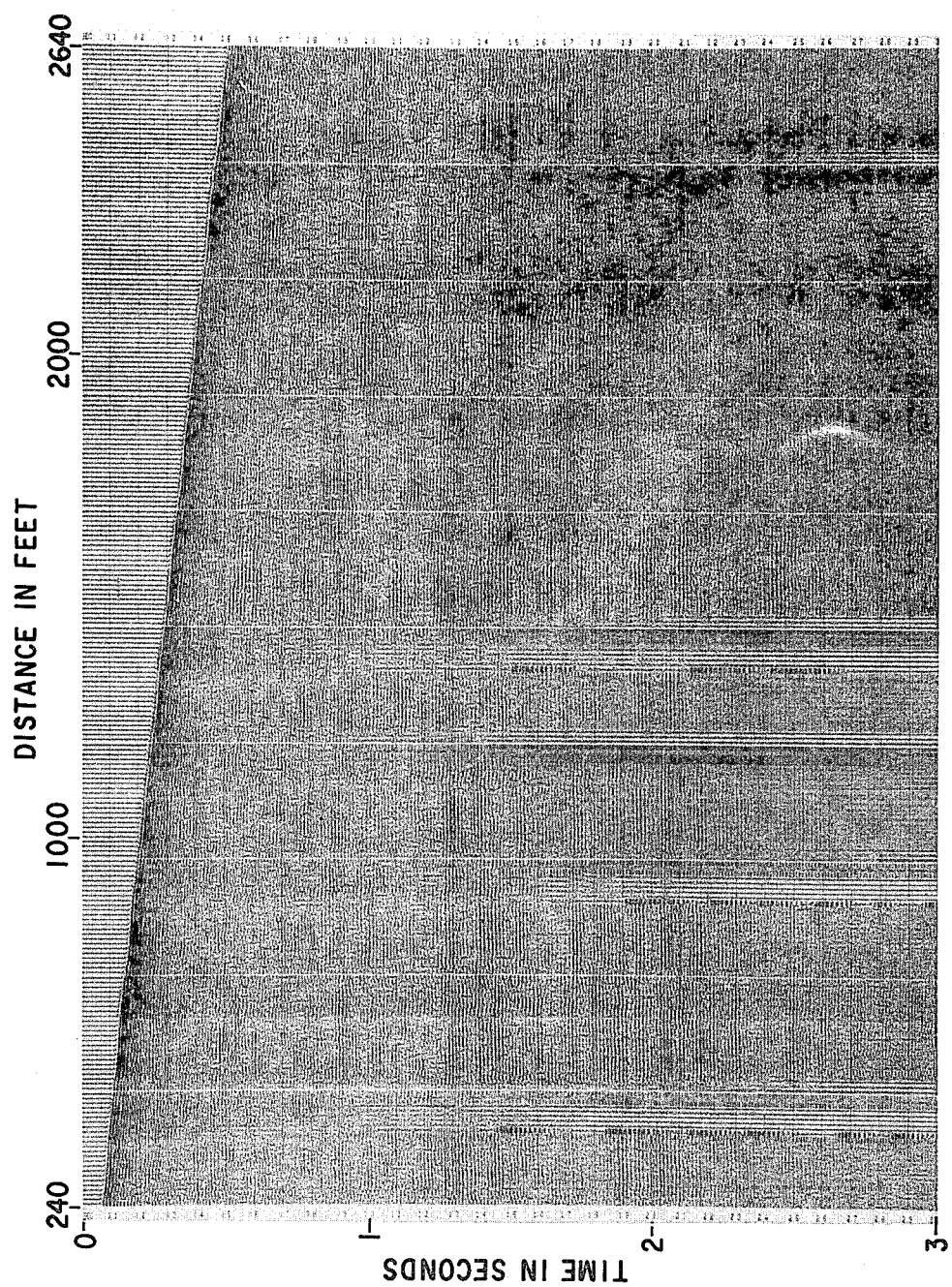

The detailed description of this invention can best be envisioned by reference to the series of figures presented in the drawing illustrating an idealized MIDAS computation sequence along with reference to specific Fortran lists of computer programs that accomplish each sequential step.

The overall MIDAS process can be viewed as involving two distinct aspects, data acquisition and data processing. However, in the actual practice of MIDAS a specific delineation between the two may not occur, yet both must be present, each with certain critical limitations, in order to achieve the improved seismic resolution and spectrum whitening of this invention. Thus in comparing specific embodiments, what is preferred to as a data processing step in one may be accounted for in another specific embodiment as an integral part of data acquisition. For example, separating the received seismic signal into a plurality of frequency limited bands can be performed entirely as a computational step after data acquisition or it can be performed as a filtering step during data acquisition.

Data Acquisition and Recording

FIG. 1 is an idealized two-dimensional representation of an input seismic trace depicting the signal as being composed of frequency bands which are a function of the time of arrival. The third independent variable (distance) of the multidimensional amplitude scaling is accounted for in that FIG. 1 represents an arbitrary but unique source-to-receiver distance and the amplitude scaling technique is performed independently on each such distance. FIG. 1 is intended to reflect certain fundamental characteristics of seismic data such as the relatively higher intensity at lower frequencies and the relative decay of amplitude with increasing time. Specifically, it is a plot of the envelope of the spectral amplitude (smoothed Fourier Transform) of a single idealized seismic trace calculated along the time axis of that trace. Because of the inability to empirically separate signal from noise no definitive statement can be made as to the actual signal-to-noise ratio. Since the signal envelope tends to plateau and level off with increasing time the portion of the observed amplitude which lies above the plateau at early times of arrival is characterized entirely as signal. However, this does not justify the converse, namely that the plateau is categorically all noise, and this is illustrated by the extrapolation of the signal curve to later arrival times by using a dashed line that penetrates into and below the plateau.

One of the basic objectives of the MIDAS data acquisition step is to optimize the signal-to-noise ratio at all frequencies. In principle, no mathematical process can restore or put back useful information, such as wavelet forms corresponding to subsurface seismic events, once the previously coherent knowledge has been sufficiently attenuated from the record. Yet on the other hand no one knows with certainty how much of the received signal is useful information and how much is noise. Thus, whether MIDAS is viewed as a band broadening procedure extending seismic analysis into a higher frequency range or alternatively viewed as an optimum method of extracting information from a frequency range which was previously considered to have an unfavorable signal-to-noise ratio, in either view it is critical that MIDAS involves a data acquisition step which inherently receives, responds to, and preserves in the record seismic data with certain minimum standards. These standards basically relate to the overall frequency range, te dynamic range of the recording system as a whole and the preservation of a relatively low amplitude frequency component in the presence of relatively large amplitude frequency components of the same signal as well as noise.

Figure 11:
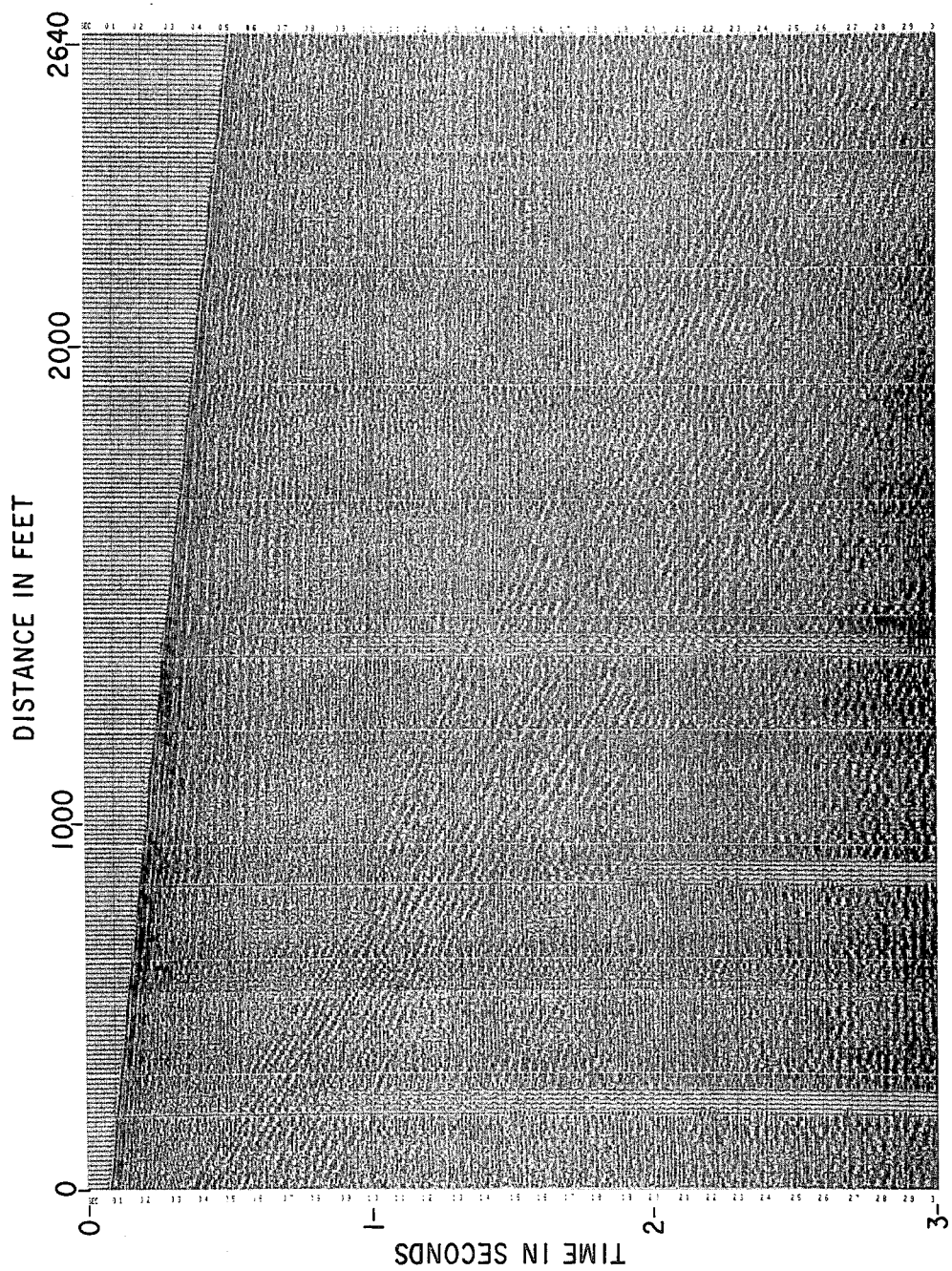
Figure 12:
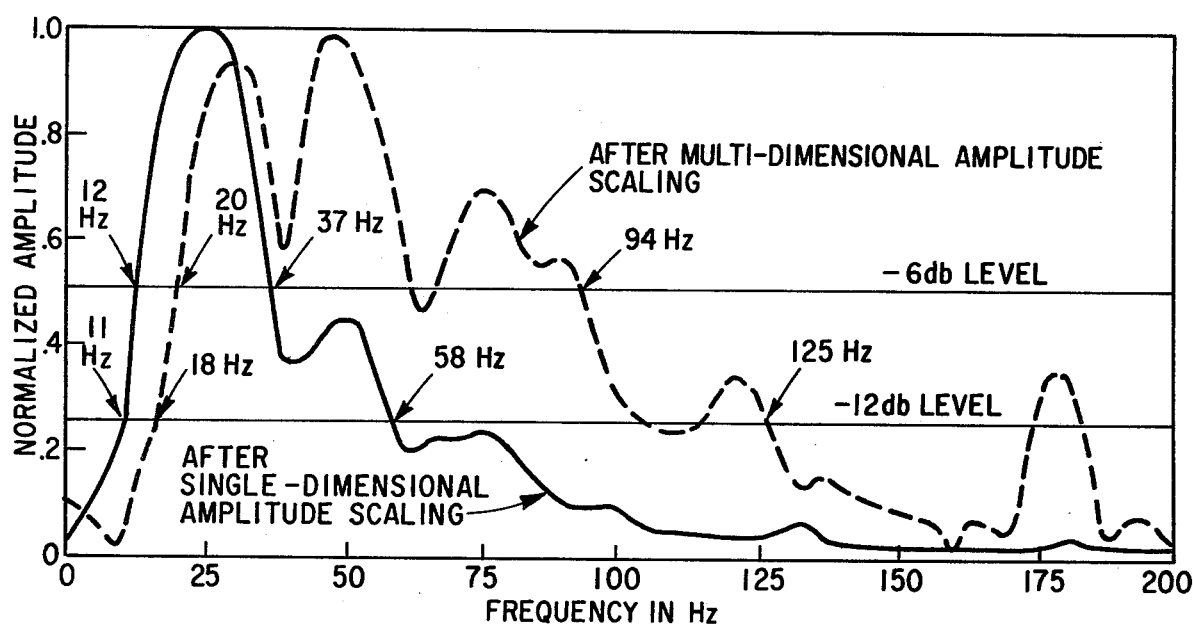
FIG. 12 is a comparison of a harmonic analysis of a single trace of the above data after conventional scaling with a harmonic analysis of the same trace after MIDAS was applied.

For purposes of this invention the seismic signal must be detected and recorded over a frequency range of at least 20 to 100 Hz. Generally the lower frequency is limited by the quality of the recording instrumentation. The specific value of 20 Hz should be viewed as being somewhat arbitrary in that the band broadening associated with MIDAS is predominantly an extension into the higher frequencies. However, in principle an extension into the lower frequency range is compatible with MIDAS processing and equipment to detect and record below the 20 Hz level is commercially available. The upper limit of 100 Hz is a conservative value in that the onset of spectrum whitening and improved resolution resulting from the use of MIDAS is visually apparent when examining seismograms over this range as presented later in the Example and in FIGS. 7-11. Harmonic analysis of the MIDAS processed data presented in the Example and as illustrated in FIG. 12 quantitatively establishes that significant seismic energy would be lost if the frequency range were terminated at a value less than 100 Hz. Further, the analysis clearly indicates the advantages of extending the MIDAS process to 200 Hz. In other applications of MIDAS excellent reflection data to a depth of 6,000 feet in the 128 to 256 Hz pass band and at depths of 8500 feet in the 64 to 128 Hz pass band have been achieved. In some cases the utility of MIDAS can extend to frequency ranges in excess of 350 Hz.

The upper value of the frequency range is limited by the Nyquist frequency as well as the quality of the instrumentation. Thus a 4 millisecond sample interval and its associated antialiasing filter will be inadequate while a 2 millisecond interval will generally be adequate for most purposes. Preferably, a 1 millisecond or even shorter sample interval will be employed for higher frequency ranges.

In selecting seismometers used for recording, the possible presence of unwanted parasitic resonances particularly at frequencies above approximately 140 Hz must be accounted for. Preferably parasitic free seismometers can be used at high frequencies. Some commercially available seismometers are Mark Products L-25D and L-25A, and GeoSpace HS-J Model K which are parasitic-free up to 200 Hz.

In addition to the frequency range limitation, the detecting and recording must be performed such that any differences in relative intensity of the various frequency components is preserved without losing any information contained in the lowest intensity frequency components (usually the highest frequency components). This requires instrumentation with a large dynamic range, and in the case of digital recording, a small quantization unit. Generally, the greater the frequency range of interest, the greater the difference in relative intensity of frequency components and as the frequency range of interest is broadened, instrumentation capable of a larger dynamic range is required. For the purposes of my invention, a frequency range of interest of 20 to 100 Hz will usually require detecting and recording with instrumentation capable of at least 60 decibel (db) dynamic range and in the case of digital recording, a quantization unit associated with a 16 bit binary number. Preferably a data acquisition process capable of recording seismic signals with a dynamic range of 90 db or more is used. Digitizing the output signal of the individual seismometers with a small quantization unit is necessary to obtain a digital representation of the seismic trace (or record) with sufficient significant figures to insure that information contained in the lowest intensity frequency components is not lost prior to later processing.

The actual detecting and recording of the reflected seismic signal according to the present invention can be done by any of the known high resolution state-of-the-art methods involving a variety of equipment available in the art provided the previously mentioned frequency, dynamic range and digital recording criteria are adhered to. Furthermore, common spread geometrics such as end-on, in-line, split and the like as well as special spread geometries such as the antialiasing of spatial frequencies described in U.S. Pat. No. 3,719,924 are compatible with MIDAS provided the geophone or array positions are known such that the amplitude decay can also be compensated for as a function of distance. Thus MIDAS in its broadest sense should be viewed as a general technique to be used advantageously on all seismic exploration data. It is particularly useful as a data pretreatment process which prepares, improves and preconditions seismic data prior to that data being subjected to other computational operations such as crosscorrelation, autocorrelation, wavelet compression, deconvolution and the like and then being displayed as a seismogram section. Although MIDAS will most frequently be used in combination with other mathematical manipulations, it should be appreciated that it has an inherent utility independent of the other operations. The individual MIDAS processed seismic traces, unlike previously known spectrum whitening processes, involve spectral amplitude broadening in combination with zero-phase-shift filtering. Consequently, the traces will exhibit some deconvolution and wavelet compression after processing.

Frequency Separation

In accordance with the present invention, each seismic trace spanning the frequency range of interest is to be separated into component traces which cover essentially non-overlapping but adjacent frequency bands. As previously stated, this can be accomplished at various stages of the overall process by various means. The separation can be a purely computational process operating on a numerical representation of the seismic trace, a physical hardware type process wherein mechanical devices and/or electronic circuitry are used to filter an electrical representation of the total seismic signal, a field type process involving more than one geophone each being prefiltered and dedicated to a portion of the total frequency spectrum, or a combination of physical separation followed by a further computational separation. Care must be taken such that the overall separation process is categorically a zero phase shift filter. Thus in the electrical type filtering process a filter design having a linear phase response across the frequency band of interest would have to be used in a manner such as the "forward reverse playback" filtering of U.S. Pat. No. 3,061,813 by Geyer or the like. Because of the physical limitations associated with real filters, the computational digital filters are more flexible with respect to minimizing phase distortion.

The particular choice of frequency bandpass range to be employed in my invention is somewhat arbitrary except for one consideration. It is desired to separate the low frequencies associated with ground roll and the like from the high frequencies that are more severely attenuated. This can be accomplished by using as few as two frequency filters having their separation point about midway through the overall frequency range of interest. Inherently, as the number of filters used increases the ease of satisfying this criterion improves and amplitude scaling as a function of frequency becomes more rigorous. The two frequency range situation will find its greatest utility in field MIDAS techniques while the purely digital computer embodiment may involve as many as 50 total filters spanning a frequency range as high as 500 Hz. However, for the digital filtering applications, breaking the total frequency range into approximately 10 bandpasses seems to be an excellent balance between the improved resolution desired and the computer processing costs involved. For the field type filtering applications the selection of the number of bandpasses to be used usually involves some simple considerations such as which type of geophone functions best over which portions of the frequency range of interest. Generally, separating the seismic traces into frequency bands of less than 10 Hz will contribute little to improving resolution. In some cases the separation into frequency bands that were less than 5 Hz wide actually resulted in a loss of resolution.

Calculation and Application of the Amplitude Scaling Factors

In accordance with the present invention, the time-variant amplitude scale factor to be calculated for each component trace is intended to account for the amplitude decay as a function of frequency, position and time. The actual computation can be performed by any of the methods well known in the art. The preferred method involves an empirical approach in that the relative amount of scaling at any given point will be computed using the actual experimental value of the amplitude at that point and its relative magnitude in relation to all other experimentally observed amplitudes. However, semi-empirical approaches could be used provided sufficient knowledge of the attenuation as a function of the independent variables is known.

In general this time-variant scale factor is to be calculated on a per-component trace basis. The scale factor is intended to compensate for decay of the seismic signal as a function of time across the entire trace, yet be insensitive to the amplitude variation within a reflected wavelet; i.e., it will compensate for the average amplitude attenuation as a function of time but not alter the relatively instantaneous amplitude variations within the seismic wavelet. Consequently, the scale factor is a smooth, slowly varying function relative to the period of a wavelet but not so overly constrained that it would be prevented from compensating for nonlinear variations relative to the time span of the trace. In practice this is achieved simply by selecting the length of the time window over which the average amplitude is to be calculated such that this window will span a time range of the order of magnitude of several periods of a wavelet, yet will involve only a fraction of the time span of the entire trace.

Optionally, the time-variant amplitude scale factors can be calculated on a set of component traces rather than per individual trace. In this manner the number of individual scale factors computed can be reduced and each scale factor will be viewed as an average associated with the particular set. In one specific alternate embodiment the sets are selected by virtue of each member trace having a common source point to receiver distance independent of the actual source point and detector location. Assuming a common source point to receiver distance corresponds approximately to the similar ray paths and hence to the same attenuation as a function of time, the amplitude scaling used the average scale factor will still preserve the scaling as a function of distance.

Having once computed the time-variant amplitude scale factor, it can then be applied to its corresponding component trace. In doing this the average attenuation or decay of the seismic signal is being negated and the resulting trace will simulate what would be expected in the absence of attenuation. The actual application will most probably be a mathematical division or multiplication in the digital computation embodiment or its analog counterpart in the hardware embodiment depending on whether the scale factor is functionally proportional to or inversely proportional to the average amplitude. However, this amplitude scale factor could be applied as a time-variant additive factor in either embodiment.

Having accounted for the average signal decay as a function of time, the scaled component traces can then be summed directly to yield the desired MIDAS processed seismic trace. Optionally, the component traces can be further scaled during this summation step to account for any relative difference in the size of the frequency subranges and/or energy content within these frequency bands. Alternatively, these corrections could have been directly accounted for in the previous time-variant scale factor computation.

Computerized Computations

The data processing of the present invention can be practiced using several well known types of computing apparatus. It is particularly suitable for use with a general purpose digital computer. One particular computing system used in practicing the method is supplied by International Business Machines, Inc., under the general model designation 370/165/168 and includes the following components:
 1432 Buffer Expander
 3850 Extended Channel
 4520 High Speed Multiply Unit
 2870 Byte Multiplexer
 3811 Controller
 3211 Printer
 3066 Line Console
 2540 Card Reader/Punch
 2860 Selector Channel
 3803 Tape Controller
 3420 Tape Drives
 2880 Block Multiplexer Channel
 3830 Controller
 3330 Disk Drives
 2938 Array Processor While the invention can be implemented by various programs, one suitable program predominantly specified in the FORTRAN language (IBM FORTRAN IV), useful on practically all digital computers, is given below. For a better understanding of the use of FORTRAN statements, reference should be made to "Introduction to FORTRAN," by S. C. Plumb, McGraw-Hill Book Company, New York, N.Y. In the case of subroutines not specified in FORTRAN, IBM assembler language is used. For explanation see "Logical Programming With System/360" by D. H. Stabley, John Wiley & Sons. An IBM compiler G or H can be used in conjunction with the program.

The plotting of the data has been carried out using the Interdata Minicomputer Model 70 connected through an interface controller to a GeoSpace Model 202 Plotter. The plotting hardware included as peripheral equipment a disc storage, magnetic tape drive, card reader as well as a line printer.

Description of the Software

Figure 13:
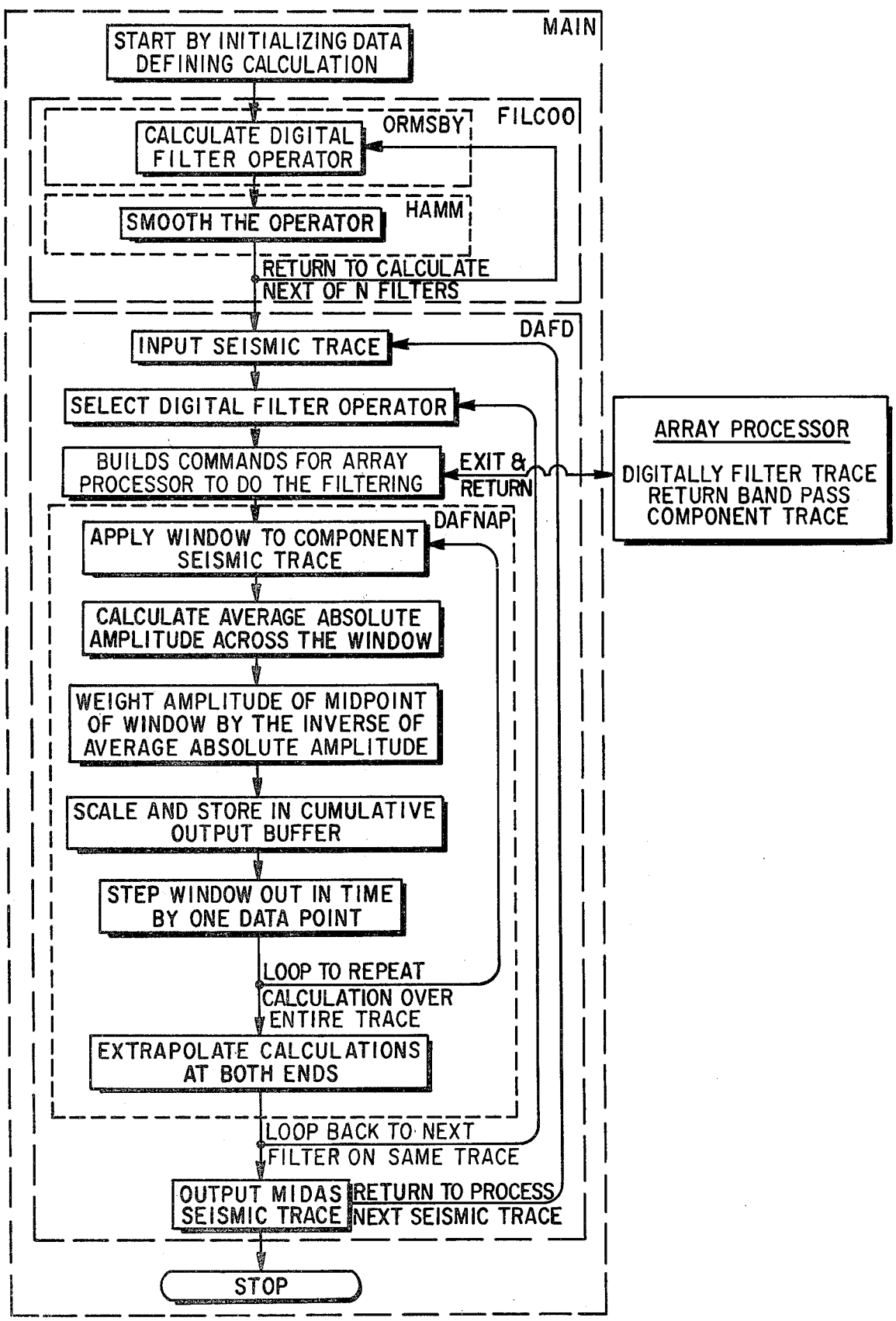
FIG. 13 is a flowchart of the preferred computer program that is routinely used to pretreat seismic data with MIDAS.

In general, the computational steps of the software package are performed according to FIG. 13. The package begins with the program called MAIN which sets up and performs much of the bookkeeping but performs essentially no calculations. Within MAIN there are two calls to separate subroutines within which essentially all of the mathematical computations are performed. The first subroutine to be called will calculate N filter operators. There are three versions of this calculation corresponding to the three subroutines FILCOM, FILCOC and FILCOO. Each of these generate smoothed Ormsby filters by sequentially calling subroutines ORMSBY and HAMM. In addition, the capability of producing and printing a simulated variable-area amplitude response curve for any given filter or the composite of N filters is incorporated by use of subroutines GRAPH3, GRAPH1 and COST1. Having established the filters which will be used to separate the seismic traces into component traces the execution sequence returns to MAIN where a call to subroutine DAFD is utilized to perform the remaining mathematical calculations. The very heart of the multidimensional amplitude scaling is performed in a processing loop which sequentially loops on the inputted seismic traces. Within this loop the CALL APBLB builds a set of instructions which involve an external array processor directing the array processor to filter the seismic trace with the respective filter operator. The instruction CALL APEX then causes these instructions, the actual filtering, to be performed by the array processor. Thus the filtering is performed external to core minimizing CPU time. After filtering, the subroutine DAFNAP is called which performs an empirical digital AGC (automatic gain control) type calculation on the component seismic trace. Briefly, this involves: selecting a running window to be shifted down the trace; calculating the sum of the absolute amplitudes within the window; weighting the amplitude of the midpoint of that window by the inverse of this sum; appropriately scaling this weighted midpoint amplitude to account for the number of sample points within the window and relative size of the bandpass of the particular filter; entering this weighted scaled midpoint value to an accumulating output buffer; stepping the window out in time in increments of one sample interval, repeating the above calculations and generating subsequent values until the entire component trace has been amplitude scaled and stored in the cummulative output buffer; and then looping over each succeeding filter thus accumulating a multidimensional amplitude scaled trace in the output buffer. At this point the subroutine APEX is used to scale and reformat the seismic trace for output and the MIDAS seismic trace is outputted to tape by CALL WREC. The processing loop of DAFD then starts over by inputting the next seismic trace.

Having thus described, in general, the important computation steps of the preferred software package, we now consider this overall process in somewhat more detail by specifically presenting and describing, in essentially an unedited form, the particular computer programs that are routinely used by applicant in performing MIDAS type conditioning of seismic data. However, before one attempts to use these programs verbatim several generalities must be kept in mind.

First, each seismic data processing installation will have associated with it a Seismic Information System (SIS) which will involve many in-house subroutines that are uniquely compatible with the particular users needs, hardware, methods of operation, formats of data and the like. Hence, there is a strong likelihood that the programs as written will not compile and execute on the first turnaround. However, an experienced programmer could quickly adapt the given programs to another user's system.

Additionally, the particular programs listed have been written and modified many times with the overall intent of coming up with a very flexible package which functions efficiently (economically) for a variety of uses. In other words the programs were not written and documented for ease of understanding or other pedagogical purposes. Because of the history of revisions the programming will not at all times be aesthetically pleasing. In fact, there will be low level error messages upon compilation but they do not hinder execution. Since a MIDAS type computation involves vast amounts of seismic data and frequently many hours of computer time per job, a great number of so-called "whistles and bells" are incorporated at various stages to check and recheck each operation and lend flexibility in case of faulty data or error. Finally, many of the subroutines that appear in the computer list are utility type routines of value to this particular user and do not go to the essence of my invention, other subroutines predate my invention and are much broader in application than necessary for MIDAS. Hence, only a portion will be relevant.

Description of Program MAIN

Program MAIN, as its name states, is the main or controlling program for the MIDAS type computation. As such it sets up much of the bookkeeping but does very little of the calculations. The FORTRAN listing of MAIN is as follows (the integers at the left are the line numbers used in the following description):

```
001        EQUIVALENCE (IHEAD(1),IHDR1(3))
002        EXTERNAL ABEN
003        LOGICAL *1 RSTR(8)
004        LOGICAL *4 KARD(20), DIS1/'1DIS'/,DIS2/'2DIS'/,
005       1 DIS3/'3DIS'/,DIS4/'4DIS'/,FLD2/'2FLD'/,
006       2 FLD3/'3FLD'/,FLD4/'4FLD'/
007        EQUIVALENCE(KARD(1),RCARD(1))
008        COMMON/W/DIST(512)
009        COMMON IHDR1(1500)
010        DIMENSION IHEAD(100), FILT(501,10)
011        INTEGER*2 IBUF(33)
012        EQUIVALENCE (IBUF(1),IHDR1(1))
013        REAL*4 CARD/ZF8C6C9D3/,CDAVC/ZF1C4C1E5/
014        REAL*4 CDAFD/ZF1C4C1C6/
015        REAL*4 N21
016        DIMENSION F(10), L(10)
017        REAL*8 CDE,F1
018        COMMON/BURP/CDE(1326),F1(126),IPLOT
019        LOGICAL*1 RCARD(80), HLHARR(4)/ZC4,ZC1,ZC6,ZC4/
020        LOGICAL*4 JOB1,JOB2
021C
022        LOGICAL *1 FIVE/ZF5/
023        LOGICAL*1 GRPINV(4),ISPA(2)/Z40,Z01/
024        INTEGER*2 FOLD, ISORT/'1'/
025        COMMON/INDEX/NSI, IGTG,IGIG,MSI,IDUM,ISP,ISPINC,ISPG,IDV
026        CALL PARM(RSTR)
027        CALL ERRSET(207,1,1,1,ABEN,301)
028        IDV = 1
029        FOLD = 16448
030        ISP = 0
031C
032C       IPR = PRINTER
033        IPR = 6
034C       ICR = CARD READER
035        ICR = 1
036        IST = 0
037        DO 9004 I = 1,512
038 9004   DIST(I) = 0.
039        I1 = -11
040        IFIELD = 1001
041        NSI = 0
042        LUI = 3
043        LUO = 8
044        IDISK = 42
045        CALL MOVE(1,RCARD(2),RSTR,8)
046        CALL MOVE(1,RSTR,RCARD(1),8)
047        CALL PARMCK(RSTR,ISTR)
048        IF(ISTR .NE. 2) GO TO 101
049        WRITE(6,9127) RSTR
050 9127   FORMAT(1H1///// '0 INVALD RSTR FIELD'//
051       1 ' FIELD WAS ',10A4)
052        DO 27 I = 1,18
053 27     WRITE(6,9585)
054 9585   FORMAT(10X)
055        CALL ABEND(9127)
056 101    IF(LSTR .EQ. 1) READ(IDISK,90128) IST, IFOR
057 90128  FORMAT(2A4)
```

```
058        IF(ISTR .EQ. 1) BACKSPACE IDISK
059        CALL MOVE (0,F)(1),0,1012)
060        CALL LBOPEN(3,8)
061        CALL HAMOCO
062        WRITE (IPR,7030)
063 7030   FORMAT('—',T41,50('*')/T41,'*',T90,'*'/T41,'* MULTIPLE F
064        1ILTER, DAVC, SUM *'/T41,'*',T90,'*'/T41,50('*')///)
065C
066C       READ INPUT TAPE HEADER
067C
068        NIT = 0
069        CALL RTAPE(LUI,IHDR1,NIT)
070        IF(NIT .EQ. 0) GO TO 80
071        CALL HLH(IHDR1,NIT,HLHARR,4)
072        READ(ICR,3) RCARD
073        CALL STRING(RCARD(1), 80)
074        READ(99,6) CKD,IPCNT,IWL,MODE,N,ITYPE
075 6      FORMAT(A4,2X,I2,1X,I4,I2,I3,I1,58X,I3)
076        WRITE(6,90127) RCARD
077        IF(IWL .EQ. 0) IWL = 500
078        IF(IPCNT .EQ. 0) IPCNT = 15
079        WRITE(6,9001) ITYPE ,MODE, N, IST
080        ITYPE = ITYPE + 1
081        IF(N .GT. 10) GO TO 290
082 9001   FORMAT(5I10)
083        IF(MODE .GT. 2 .OR. MODE .LT. 0) GO TO 7040
084        IF(CKD .NE. CDAVC .AND. CKD .NE. CDAFD) GO TO 7050
085C
086C       CHECK FOR 5INDEX CARD
087C
088        READ(ICR,3) RCARD
089        IF(RCARD(1) .NE. FIVE) GO TO 2
090        WRITE(6,90127) RCARD
091        CALL STRING(RCARD(1),80)
092        READ(99,21)NSI,IGTG,IGIG,MST,FOLD,(GRPINV(I),I = 2,4),ISP,ISPA(1),
093        READ(99,21)NSI,IGIG,IGIG,MSI,FOLD,(GRPINV(I),I , ISPG
094 21     FORMAT(6X,4I2,A2,3A1,13X,I4,A1,I3,1X,I2)
095        WRITE(IPR,21)NSI,IGTG,IGIG,MSI,FOLD,(GRPINV(I),I = 2,4),ISP,
096        *ISPA(1),ISPINC,ISPG
097        ISPG = ISPG *2
098        IF(ISPINC .EQ. 0) ISPINC = 1
099        IF(MSI .GT. 1) IDV = 2
100        IF(MSI .EQ. 0) MSI = 1
101        CALL MOVE(1,IHDR1(1001),RCARD,80)
102C
103        READ(ICR,3) RCARD
104 3      FORMAT(80A1)
105 2      CONTINUE
106C
107 40     IF(KARD(1) .EQ. FLD2) GO TO 45
108        IF(KARD(1) .EQ. FLD3) GO TO 45
109        IF(KARD(1) .EQ. FLD4) GO TO 45
110        GO TO 50
111C
112 45     WRITE(6,90127) RCARD
113        IFIELD = IFIELD + 20
114        CALL MOVE(1,IHDR1(IFIELD),RCARD,80)
115        READ(ICR,3) RCARD
116        GO TO 40
117C
118 50     IF(IFIELD .NE. 1001) CALL FIELDH(IHDR1,IHDR1(1001),NIT)
119 90024  FORMAT(1H1,(10X,12F8.0))
120 90129  FORMAT(5X,12F5.0)
121        IF(KARD(1) .NE. DIS1) GO TO 55
122 30     WRITE(6,90127) RCARD
123        CALL STRING(RCARD(1),80)
124        I1 = I1 + 12
125        I2 = I1 + 11
126 90025  FORMAT(6I6)
127        READ(99,90129) (DIST(I),I = I1,I2)
128        WRITE(6,9002) IST
129 9002   FORMAT(//10X,'RECORDS THRU RI', I3,'PREVIOUSLY PROCESSED')
130C
131        READ(ICR,3) RCARD
132        IF(KARD(1) .EQ. DIS2) GO TO 30
133        IF(KARD(1) .EQ. DIS3) GO TO 30
134        IF(KARD(1) .EQ. DIS4) GO TO 30
135C
136 55     WRITE(6,90127) RCARD
137 90127  FORMAT(10X,80A1)
138        CALL STRING(RCARD(1),80)
139        READ(99,5)CKD,IF1,IF2,IF3,IF4,IF5,IF6,IF7,IF8,INVERT,LISTF,IPRCT,
```

```
140        1IWINS,IWINE,JOB1,JOB2
141  5     FORMAT(A4,1X,8I3,2I1,I3,2I5,23X,2A4)
142        IFLAG = LISTF
143        IF(CKD.NE.CARD)GO TO 7000
144C
145        ISI = IHEAD(13)
146        INI = IHEAD(14)
147        IF(ISTR .NE. 1) IFOR = IBUF(33)
148        IF(FOLD .NE. 16448) IBUF(38) = FOLD
149        IF(FOLD .NE. 16448) IBUF(37) =ISORT
150        IF(IFOR .LT. 1 .OR. IFOR .GT. 4) IFOR = 0
151        NTR = IHEAD(11)
152 15     IBUF(33) = 2
153        CALL PSDATE(IHEAD(5))
154C       WRITE HEADER TO OUTPUT TAPE
155        IF(IST .EQ. 0) CALL WREC(LUO,IHDR1,NIT)
156C
157        IF(MODE .NE. 0) GO TO 100
158        N = 1
159        GO TO 17
160 16     READ(ICR,3,END = 8000) RCARD
161        CALL STRING(RCARD(1),80)
162        READ(99,5) CKD,IF1,IF2,IF3,IF4,IF5,IF6,IF7,IF8,INVERT,LISTF,IPRCT
163       1,IWINS, IWINE, JOB1, JOB2
164        IF(CKD .NE. CARD) GO TO 7000
165        IFLAG = LISTF
166        N = N + 1
167        IF(N .LE. 10) GO TO 17
168 290    WRITE(6,9002)
169 9002   FORMAT('1 MORE THAN 10 FILT CARDS')
170        CALL ABEND(9002)
171C
172 17     CONTINUE
173C       PRINT 8FILT CARD PARAMETERS
174        WRITE(IPR,20)IF1,IF2,IF3,IF4,IF5,IF6,IF7,IF8,INVERT,LISTF,IPRCT,IW
175       1INS,IWINE,JOB1,JOB2
176 20     FORMAT(9X,71H8FILT IF1 IF2 IF3 IF4 IF5 IF6 IF7 IF8 INVERT LISTF I
177       1PRCT IWINS IWINE/16X,8(I3,1X),2X,I1,6X,I1,5X,I3,3X,I5,1X,I5,27X,
178       22A4)
179C
180C       * * * * COMPUTE ORMSBY-RICKER FILTER * * * *
181C
182C
183C       ITYPE 0 = OPTIMUM
184C       ITYPE 1 = FIXED
185C       ITYPE 2 = OLD
186C
187        GO TO (320,310,300),ITYPE
188 300    CALL FILCOM(ISI,IF1,IF2,IF3,IF4,IF5,IF6,IF7,IF8,IAA,M,INVERT,
189       1 IFLAG,FILT(1,N),IPR)
190        GO TO 330
191 310    CALL FILCOC(ISI,IF1,IF2,IF3,IF4,IF5,IF6,IF7,IF8,IAA,M,INVERT,
192       1 IFLAG,FILT(1,N),IPR)
193        GO TO 330
194 320    CALL FILCOO(ISI,IF1,IF2,IF3,IF4,IF5,IF6,IF7,IF8,IAA,M,INVERT,
195       1 IFLAG,FILT(1,N),IPR)
196 330    CONTINUE
197C
198        L(N) = M
199        IF(N .EQ. 1) GO TO 25
200        F(N) = ((IF4 + IF1 – IF2 – IF3)/ 2. + IF3 – IF1)/FSCALE
201        GO TO 16
202 25     FSCALE = (IF4 + IF1 – IF2 – IF3)/2. + IF3 – IF1
203        F(1) = 1.
204        GO TO 16
205 100    INC34 = IF4 – IF3
206        LEN = IF3 – IF1
207        FACT = 1.
208        DO 200 JII = 1,N
209        WRITE(6,20)IF1,IF2,IF3,IF4,IF5,IF6,IF7,IF8,INVERT,LISTF,
210       1 IPRCT,IWINS,IWINE,JOB1,JOB2
211C
212C       ITYPE 0 = OPTIMUM
213C       ITYPE 1 = FIXED
214C       ITYPE 2 = OLD
215C
216        GO TO (420, 410, 400), ITYPE
217 400    CALL FILCOM(ISI,IF1,IF2,IF3,IF4,IF5,IF6,IF7,IF8,IAA,M,INVERT,
218       1 IFLAG,FILT(1,JII),IPR)
219        GO TO 430
220 410    CALL FILCOC(ISI,IF1,IF2,IF3,IF4,IF5,IF6,IF7,IF8,IAA,M,INVERT,
221       1 IFLAG,FILT(1,JII),IPR)
```

| | | |
|---|---|---|
| | | -continued |
| 222 | | GO TO 430 |
| 223 | 420 | CALL FILCOO(ISI,IF1,IF2,IF3,IF4,IF5,IF6,IF7,IF8,IAA,M,INVERT, |
| 224 | | 1 IFLAG,FILT(1,JII),IPR) |
| 225 | 430 | CONTINUE |
| 226 | | L(JII) = M |
| 227 | | F(JII) = FACT |
| 228 | | IF1 = IF3 |
| 229 | | IF2 = IF4 |
| 230 | | FACT = FACT * MODE |
| 231 | | LEN = LEN * MODE |
| 232 | | IF3 = IF3 + LEN |
| 223 | 200 | IF4 = IF3 + INC34 |
| 234 | C | |
| 235 | 8000 | N21 = 2 * N + 1 |
| 236 | | IPLOT = 1 |
| 237 | | CALL GRAF3(126,1,ISI,6) |
| 238 | | CALL NACCT('DAFD',IHDR1,N21) |
| 239 | | CALL DAFD(N,FILT,F,INI,IFOR,IWL,IPCNT,L,ISI,NTR,IST) |
| 240 | | CALL NACCT1 |
| 241 | | DO 9003 I = 1,18 |
| 242 | 9003 | WRITE(6,9585) |
| 243 | | STOP |
| 244 | 80 | WRITE(IPR,1003) |
| 245 | 1003 | FORMAT(5X, 'EOF ON INPUT TAPE') |
| 246 | | CALL NACCT1 |
| 247 | | CALL ABEND(80) |
| 248 | 7000 | WRITE(IPR,7005) CKD,CARD |
| 249 | 7005 | FORMAT(10X,20H 8FIL CARD NOT FOUND,A4,2X,A4) |
| 250 | | CALL ABEND(7000) |
| 251 | 7040 | WRITE(6,7041) MODE |
| 252 | 7041 | FORMAT(1H1,10X, 'MODE INCORRECT'/10X, 'MODE = ',I5) |
| 253 | | CALL ABEND(7040) |
| 254 | 7050 | WRITE(6,7051) CKD |
| 255 | 7051 | FORMAT(1H1,10X, 'NO 1DAVC CARD FOUND'/10X,'CARD = ', A4) |
| 256 | | CALL ABEND(7050) |
| 257 | | END |

The following comments refer to the program listing above.

Lines 1 through 25 set up, define and reserve storage for various arrays.

Line 26 calls subroutine PARM which picks up a parameter from the JCL. The parameter is used later to restart the program without rerunning the entire job.

Line 27 calls subroutine ERRSET which initializes various flags in an error routine. This error routine basically allows the program, if there is a problem, to ABEND with a dump. But if there is an error such as a divide check the program will continue to process without a dump but will quit after ten of these checks.

Lines 28 through 44 initialize the values for various parameters, variables and arrays to be used later. IPR, ICR, LUI, LUO and IDISK are input and output file logical unit numbers.

Lines 45 through 59 are a series of statements which utilize the restart flexibility of this program and, as such, are not critical to the understanding of the MIDAS type computation. Specifically, MOVE is a subroutine which is the FORTRAN equivalent of the COBOL statement MOVE. See for the later pp. 197 to 199 of IBM Systems Reference Library File No. S 360-24, Order No. GC 28-6396-4, copyrighted 1972. It transposes data between arrays. CALL PARMCK is a subroutine which uses the previous JCL parameter from CALL PARM in order to check what type it is. It transfers back a value of 0, 1 or 2 in the second variable, ISTR, depending on whether the error is new, a restart or a bad run. If ISTR=2 an invalid restart field must be present and an error message to this extent will be printed. CALL ABEND is an IBM subroutine which will terminate the run. Otherwise, IST and IFOR will be either entered or retrieved from disc depending on new or restart status.

Line 60 is a call to subroutine LBOPEN which opens the I/O tapes. In this case the 3 is the logical input and 8 is the logical output.

Line 61 is a call to subroutine HAMOCO which prints a decorative torch and oval label identifying the user.

Lines 62 to 64 print an output header.

Lines 68 and 69 are the beginning points for the specific calculation to be performed. Line 68 initialized NIT to zero. CALL RTAPE is a general subroutine which reads the input tape corresponding to the logical unit LUI. The second variable identifies the buffer which is to be read, in this case the IHDR1 array. The third variable returns the number of bytes which were read.

Line 70 is a check to see if a non-zero number of bytes were read. If no information is read the control is transferred to line 80 where an error message is printed and the run terminates.

Line 71 is a call to subroutine HLH which is an SIS type program that prints a historical line header corresponding to the information read in line 69. This would involve such information as the number of traces, sample points, locations, type of shooting and the like. Again, this is essentially bookkeeping but necessary in order to identify the seismic data which are about to be processed.

Line 72 is a read statement which inputs the DAFD card, according to FORMAT of line 104, containing parameters used to define the particular MIDAS calculation desired.

Line 73 is a call to subroutine STRING which creates the ability to reread the same DAFD data card in a different FORMAT.

Lines 73 and 75 do the rereading and set the values of the following variables:

| | | |
|---|---|---|
| CKD | - | EBCDIC variable used to check if DAFD card is present. |
| IPCNT | - | Scaling percentage (times 100) of the time window used in calculating amplitude scaling factors. |
| IWL | - | Length of the time window in ms (milliseconds). |
| MODE | - | Parameter used to select method of establishing frequency bandpass ranges. |
| N | - | Number of frequency bandpass filters. |
| ITYPE | - | Parameter used to determine which version of the "FILCO" subroutine is to be used. |

Line 76 outputs the DAFD data on the printer.

Line 77 automatically sets the window to 500 ms if the user decides not to select a value.

Line 78 automatically selects a 15 percent scaling factor if the user decides not to select a value.

Line 79 outputs various values and identifies each according to the FORMAT of line 82.

Line 80 steps up ITYPE by 1.

Line 81 limits calculation to 10 filters by executing statement 290 of line 168 if N is greater than 10. The value of 10 is somewhat arbitrary and can be increased by minor modifications of the program.

Line 83 restricts MODE to three options, otherwise execution transfers to line 251, statement 7040, which indicates an error and terminates.

Line 84 checks if a DAVC or a DAFD card was read in at line 72. If not, execution transfers to line 254, which indicates an error and stops.

Lines 88 through 134 are a series of optional inputs and their corresponding outputs via the card reader. They give the program added flexibility but again merely represents bookkeeping. Specifically, lines 89 through 101 check for a 5INDEX card which contains added indexing on the trace headers. Lines 107 through 118 check for additional field history cards and lines 121 through 134 check for additional distance cards. Upon inputting the first filter card (a non-optional input) execution will transfer to statement 55, line 136.

Lines 136 to 141 print the first filter card as previously read, calls STRING such that the filter data can be reread and then rereads this data defining the values of the following variables:

| | | |
|---|---|---|
| CKD | - | EBCDIC variable used to check if filter card is present. |
| IF1 to IF8 | - | Frequencies in Hz defining the filters; IF1 to IF4 are the frequencies of the corners of the trapezoid and IF5 to IF8 are usually set equal to zero. |
| INVERT | - | Parameter used to invert data before filtering if desired. |
| LISTF | - | Parameter used to decide if a graph of the amplitude response of filter is to be made. |
| IPRCT | - | Parameter no longer used. |
| IWINS | - | Parameter no longer used. |
| IWINE | - | Parameter no longer used. |
| JOB1 | - | Optional parameter to identify the job. |
| JOB2 | - | Optional parameter to identify the job. |

Line 142 initializes IFLAG.

Line 143 checks if the card read was a filter card. If not, execution goes to line 248, states error and ends.

Lines 145 through 152 initialize various items.

Line 153 calls subroutine FSDATE which prints the date.

Line 155 writes header to the output tape by calling WREC.

Line 157 transfers the execution of the program to statement 100 of line 205 if there is only one filter card defining the first frequency bandpass and all other frequency ranges are to be calculated from the first; i.e., MODE=1 or MODE=2. If MODE=0 then there will be one filter card for each frequency bandpass.

Lines 158 through 204 take the data on given filter card, calculate the frequency range for that filter, compute a smoothed Ormsby filter for that frequency range, compute a relative scaling factor for that filter by considering the first filter as unity, and continue to do this for each filter card until all filter cards are read whereupon it transfers execution to statement 8000, line 235.

Line 158 initializes N equal to one.

Line 159 transfers execution to statement 17 bypassing the reading of filter card since the first filter card has already been used.

Line 160 reads the filter cards.

Line 161 calls STRING such that the filter data can be reread.

Lines 162 and 163 do the rereading.

Line 164 checks if it is a filter card.

Line 165 sets IFLAG equal to LISTF.

Line 166 steps up N to N+1.

Lines 167 to 170 check if N exceeds 10; i.e., more than 10 filters. If so, the program terminates.

Line 172 continues execution.

Lines 174 to 178 print the filter card data.

Line 187 transfers the execution to one of three statements (320, 310, or 300), each of which calls a subroutine that calculates a smoothed Ormsby filter operator. If ITYPE=0, FILCOO is called yielding an optimum filter. If ITYPE=1, FILCOC is called producing a fixed filter operator. If ITYPE=2, FILCOM is called and the old type filter operator is produced.

Line 196 continues its execution upon return from the filter subroutines.

Line 198 stores the value of M after each filter operator is produced.

Line 199 transfers execution to line 202 for the first filter only.

Line 200 calculates and stores in F a relative weighting factor based on the relative area of the ideal or desired trapezoidal amplitude response curve.

Line 201 loops back to the filter card read statement.

Line 202 calculates denominator of line 200 corresponding to the area of the first filter.

Line 203 sets the weighting factor for the first filter equal to unity.

Line 204 transfers execution to the filter card read statement.

Lines 205 to 207 initialize variables which are used to generate frequency bandpass parameters when MODE is 1 or 2 and only one filter is initially defined on an input card.

Line 208 is the stare of a do-loop which loops over N filters.

Lines 209 and 210 print the filter parameters of the filter being calculated.

Lines 216 through 225 perform the same function as lines 181 through 196.

Lines 226 through 233 calculate the filter parameters of the next filter operator from the parameters of the previous one. MODE=1 represents an even spacing in the frequency range; i.e., all bandpasses are of equal frequency range. MODE=2 represents increasing each frequency range by a constant multiple of two; i.e., the bandpasses double in frequency range as each successive filter proceeds to higher frequencies.

Lines 235 and 236 initial variables used in plotting the filters and how much to charge the user.

Line 237 calls the subroutine GRAPH3 which plots the filters.

Line 238 calls the subroutine NACCT which computes and bills the user for internal accounting.

Line 239 calls subroutine DAFD which performs the multidimensional amplitude scaling of the seismic data.

Line 240 calls subroutine NACCT1 which involves further inhouse accounting.

Line 243 stops execution upon return from DAFD.

Description of Programs FILCOO, FILCOC, and FILCOM

All three of the filter programs generate a smoothed Ormsby filter from a set of design frequencies. These design frequencies are the vertices of a trapezoid representing the amplitude response of the filter and are named IF1 through IF8. These programs as originally written and as presented here are more general than is required for a MIDAS type computation. MIDAS uses a bandpass filter which requires only four design frequencies as represented below:

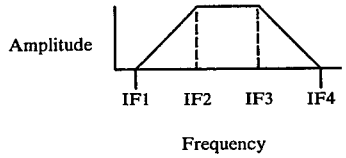

Amplitude

IF1  IF2   IF3   IF4

Frequency

Thus, those portions of the program referring to low cut, high cut, and stacked filters are not required. Basically, each call to a "FILCO" subroutine will involve the data from one filter card. Thus, the user should enter in ascending order on each filter card, four frequencies corresponding to IF1 through IF4 and four zeros corresponding to IF5 through IF8. Care should be exercised in picking filter parameters for several reasons. First, the low frequency components should be separated from the high such that selective amplitude decay can be compensated for, yet covering the entire frequency range without gaps is desired. To accomplish this, it is useful to use the IF3 and IF4 of one filter as the IF1 and IF2 values of the next higher bandpass and have these regions of overlap occur between each adjacent bandpass over the entire frequency range of interest (but not necessarily evenly spaced). Additionally, the slopes of the trapezoid should not be too steep, otherwise a very long filter operation would be required. Premature truncation of the numerical operator may lead to an undesirable ringing operator. Further, the high frequency end of the filter should not exceed the Nyquist frequency for the particular sample interval. The three options corresponding to the three subroutines are, in principle, the same smoothed Ormsby filters differing only in terms of the algorithm used to determine where to truncate the numerical approximation. In FILCOO a so-called optimum operator length is calculated while in FILCOC a so-called fixed length operator is generated. FILCOM uses an alternate method for establishing an optimum truncation point. Because of their similarity only FILCOO will be reproduced in its entirety. However, where appropriate the other version will be stated. The arguments for the subroutines are as follows:

| | |
|---|---|
| ISI | - The sample interval expressed in milliseconds. |
| IF1 to IF4 | - The four vertices of the trapezoidal response curve for the desired filter expressed in Hz. |
| IF5 to IF6 | - The unused design frequencies set equal to zero. |
| IAA | - Time lag. |
| M | - The number of elements in the final digital filter (length of final filter). |
| INVERT | - The flag used to invert the filter operator if so desired. |
| IFLAG | - The flag used to compute and plot amplitude response curve if desired. |
| FILT | - The array containing the digital filter operator generated by the subroutine. |
| IPR | - Logical Unit for output. |

The FORTRAN list for program FILCOO is as follows:

```
159     SUBROUTINE FILCOO (ISI,IF1,IF2,IF3,IF4,IF5,IF6,IF7,IF8,IAA,M,INVER
160    1T,IFLAG,FILT,IPR)
161C
162     DIMENSION IFILT(501)
163     REAL*8 C,D,E
164     REAL*4 FILT(501)
165     COMMON /BURP C(600),D(600),E(126)
166     EQUIVALENCE (IFILT(1),D(1))
167C
168C            CONVERTED FROM CDC TO IBM 360
169C
170C
171C
172C         *****
173C         FILCOMP COMPUTES A SMOOTHED ORMSBY FILTER OPERATOR AND
174C         ITS AMPLITUDE RESPONSE.
175C         IF1 THROUGH IF8 ARE THE DESIGN FREQUENCIES.
176C         ISI IS THE SAMPLE INTERVAL
177C         *****
178C
179C            COMPUTE AND SET FILTER PARAMETERS
180C               KSF AND ISF=FILTER AMPLITUDE ADJUST
181C               N=LENGTH OF FILTER BEFORE COMP
182C               FACT=SCALING FACTOR
183C               ITYPE=TYPE OF FILTER
184C                  0=BANDPASS SINGLE STAGE
185C                  1=LOWCUT SINGLE STAGE
186C                  2=HIGHCUT SINGLE STAGE
187C                  3=STACKED FILTER,DOUBLE STAGE
```

```
188C             INVERT=INVERSION FLAG
189C                0=DO NOT INVERT FILTER
190C                1=INVERT FILTER
191C             IFLAG=GRAPH FLAG FOR AMPLITUDE RESPONSE
192C                0=DO NOT COMPUTE
193C                1=COMPUTE AND GRAPH
194C                2=COMPUTE,GRAPH AND LIST
195C             IAA=TIME LAG
196C             M=LENGTH OF FINAL FILTER
197C
198C        SET GAIN VALUE
199         CONST1=817531.9022
200         CONST2=51.8601
201         IPR=6
202         GAIN=1.0
203         IF(ISI.NE.12)GO TO 10
204         GAIN=1.45
205      10 SI=FLOAT(ISI)
206         X=480/SI
207         Y=400/SI
208         Z=360/SI
209         FMAX=1000.0/(2.0*SI)
210         ITYPE=0
211         F1=FLOAT(IF1)
212         F2=FLOAT(IF2)
213         F3=FLOAT(IF3)
214         F4=FLOAT(IF4)
215         F5=FLOAT(IF5)
216         F6=FLOAT(IF6)
217         F7=FLOAT(IF7)
218         F8=FLOAT(IF8)
219C
220C        CHECK FOR ASCENDING F VALUES AND SET '0' HIGHS TO FMAX
221C
222         IF(IF5.EQ.0)GO TO 410
223         ITYPE=3
224     410 IF(IF1.EQ.0.AND.IF2.EQ.0) GO TO 420
225         IF(IF1.GE.IF2) GO TO 430
226     420 IF(ITYPE.NE.3) GO TO 450
227         IF(IF2.GT.IF3) GO TO 430
228         IF(IF3.GE.IF4) GO TO 430
229         IF(IF4.GT.IF5) GO TO 430
230         IF(IF5.GE.IF6) GO TO 430
231         IF(IF8.NE.0) GO TO 510
232         IF(IF7.NE.0) GO TO 530
233         F7=FMAX
234     530 F8=FMAX
235     510 IF(F6.GT.F7) GO TO 430
236         IF(F7.LT.F8) GO TO 550
237         IF(F7.EQ.FMAX.AND.F8.EQ.FMAX) GO TO 570
238         GO TO 560
239     550 IF(F8.GT.FMAX) GO TO 560
240         GO TO 570
241     450 IF(IF4.NE.0) GO TO 590
242         IF(IF3.NE.0) GO TO 610
243         F3=FMAX
244     610 F4=FMAX
245     590 IF(F2.GT.F3) GO TO 430
246         IF(F3.LT.F4) GO TO 630
247         IF(F3.EQ.FMAX.AND.F4.EQ.FMAX) GO TO 30
248         GO TO 560
249     630 IF(F4.GT.FMAX) GO TO 560
250         GO TO 30
251     570 ASF=(ALOG(1000.0/(GAIN*(F8+F7+F4+F3-F6-F5-F2-F1))))/.69315
252         KSF=IFIX(ASF)
253         IF(F8.NE.F7) GO TO 650
254         IF(F8.EQ.FMAX) GO TO 660
255     650 L1=CONST1/(SI*(CONST2+F8-F7)*(CONST2+F8-F7))
256         IW=IF8-IF7
257         IF(IW.EQ.1) L1=X
258         IF(IW.EQ.2) L1=Y
259         IF(IW.EQ.3) L1=Z
260         GO TO 670
261     660 L1=0
262     670 L2=CONST1/(SI*(CONST2+F6-F5)*(CONST2+F6-F5))
263         IW=IF6-IF5
264         IF(IW.EQ.1) L2=X
265         IF(IW.EQ.2) l2=Y
266         IF(IW.EQ.3) L2=Z
267         L3=CONST1/(SI*(CONST2+F4-F3)*(CONST2+F4-F3))
268         IW=IF4-IF3
269         IF(IW.EQ.1) L3=X
```

```
270         IF(IW.EQ.2) L3=Y
271         IF(IW.EQ.3) L3=Z
272         IF(IF1.NE.IF2) GO TO 690
273         IF(IF1.NE.0) GO TO 690
274         L4=0
275         GO TO 710
276     690 L4=CONST1/(SI*(CONST2+F2-F1)*(CONST2+F2-F1))
277         IW=IF2-IF1
278         IF(IW.EQ.1) L4=X
279         IF(IW.EQ.2) L4=Y
280         IF(IW.EQ.3) L4=Z
281     710 IF(L2.GE.L1)GO TO 730
282         L2=L1
283     730 IF(L3.GE.Lz)GO GO TO 750
284         L3=L2
285     750 IF(L4.GE.L3) GO TO 770
286         L4=L3
287     770 N=L4
288         GO TO 140
289C
290C
291      30 ASF=(ALOG(1000.0/(GAIN*(F4+F3-F2-F1))))/.69315
292         KSF=IFIX(ASF)
293         IF(F4.NE.F3) GO TO 50
294         IF(F4.EQ.FMAX) GO TO 60
295      50 L1=CONST1/(SI*(CONST2+F4-F3)*(CONST2+F4-F3))
296         IW=IF4-IF3
297         IF(IW.EQ.1) L1=X
298         IF(IW.EQ.2) L1=Y
299         IF(IW.EQ.3) L1=Z
300         GO TO 100
301      60 L1=0
302         ITYPE=1
303     100 IF(IF1.NE.IFz)GO TO 80
304         IF(IF1.EQ.0)GO TO 90
305      80 L2=CONST1/(SI*(CONST2+F2-F1)*(CONST2+F2-F1))
306         IW=IF2-IF1
307         IF(IW.EQ.1) L2=X
308         IF(IW.EQ.2) L2=Y
309         IF(IW.EQ.3) L2=Z
310         GO TO 110
311      90 L2=0
312         ITYPE=2
313     110 IF(L2.LT.L1) GO TO 130
314     120 N=L2
315         GO TO 140
316     130 N=L1
317     140 ISF=I1+KSF-IFIX(ALOG(SI)/.6931+.0001)
318         SFN=2.0**KSF
319         FACT=GAIN*2.0*SFN
320         IF(N.GT.250) N=250
321         IF(TYPE.NE.0)GO TO 160
322C
323C            COMPUTE BANDPASS FILTER
324C
325     150 CALL ORMSBY (N,F3,F4,LC,ISI)
326         DO 380 I=1,LC
327         D(I)=C(I)
328     380 CONTINUE
329         CALL ORMSBY (N,F1,F2,LC,ISI)
330         DO 180 I=1,LC
331     180 C(I)=(D(I)-C(I))*FACT
332         GO TO 220
333C
334C            COMPUTE LOWCUT FILTER
335C
336     160 IF(ITYPE.NE.1)GO TO 170
337         CALL ORMSBY(N,F1,F2,LC,ISI)
338         DO 190 I=1,LC
339         C(I)=-C(I)
340     190 CONTINUE
341         C(N+1)=C(N+1)+1000.0/SI
342         DO 200 I=1,LC
343         C(I)=C(I)*FACT
344     200 CONTINUE
345         GO TO 220
346C
347C            COMPUTE HIGHCUT FILTER
348C
349     170 IF(ITYPE.NE.z)GO p162 TO 780
350         CALL ORMSBY(N,F3,F4,LC,ISI)
351         DO 210 I=1,LC
```

```
352            C(I)=C(I)*FACT
353     210 CONTINUE
354         GO TO 220
355C
356C            COMPUTE STACKED FILTER
357     780 LC=2*N+1
358         IF8IF.EQ.0.AND.IFZ.EQ.0)GO TO 800
359         CALL ORMSBY(N,F1,F2,LC,ISI)
360         DO 790 I=1,LC
361         D(I)=C(I)
362     790 CONTINUE
385C        GO TO 830
364     800 DO 820 I=1,LC
365         D(I)=0.0
366     820 CONTINUE
367     830 CALL ORMSBY(N,F3,F4,LC,ISI)
368         DO 840 I=1,LC
369         D(I)=C(I)-D(I)
370     840 CONTINUE
371         CALL ORMSBY(N,F5,F6,LC,ISI)
372         DO 850 I=1,LC
373         D(I)=D(I)-C(I)
374     850 CONTINUE
375         IF(F8.EQ. FMAX)GO TO 860
376         CALL ORMSBY(N,F7,F8,LC,ISI)
377         GO TO 890
378     860 DO 880 I=1.LC
379         C(I)=0.0
380     880 CONTINUE
381         C(N+1)=1000.0/SI
382     890 DO 900 I=1,LC
383         C(I)=FACT*(C(I)+D(I))
384     900 CONTINUE
385C
386C            SMOOTH THE OPERATOR WITH HAMMING SMOOTHING
387C
388     220 CALL HAMM(LC)
389C
390C
391C            DISCARD ZERO VALUES
392C
393         DO 280 I=1,LC
394         IF(C(I).EQ.0.0) GO TO 280
395         IK=I
396         GO TO 300
397     280 CONTINUE
398     300 IK=IK-1
399         M=LC-2*IK
400         DO 310 KK=1,M
401         L=KK+IK
402         C(KK)=C(L)
403     310 CONTINUE
404       3 FORMAT(5(10X,F13.8))
405C
406C            IFILT IS THE FINAL INTEGER FILTER OPERATOR
407C
408C
409C            COMPUTE AMPLITUDE RESPONSE
410C
411     980 IF(ISI.IE.4) GO TO 340
412         FDEL=1.0
413         GO TO 350
414     340 FDEL=FMAX/125.0
415     350 CALL COST1(M,FDEL,FMAX,SFN,ISI,IFLAG,IPR)
416         ASF=2.0**ISF
417         IF(INVERT.EQ.0) GO TO 960
418         DO 320 I=1,M
419         FILT(I)=-C(I)/ASF
420     320 CONTINUE
421         GO TO 390
422     960 DO 970 I=1,M
423     970 FILT(I)=C(I)/ASF
424         IF(IFLAG .EQ. 0) GO TO 930
425     390 WRITE(IPR,7)(112)GRSPH(M-ISI
426       7 FORMAT(10X,16HSAMPLE INTERVAL=,I3,4H MS.)
427         WRITE(IPR,2) M
428       2 FORMAT(10X,3HTHE,I4,21H OPERATOR POINTS ARE,/)
429         WRITE(IPR,3) (FILT(I),I=1,M)
430         CALL FRAPH1(M-1)/2, IPR, FILT)
431     930 RETURN
432     430 WRITE(IPR,4)
433       4 FORMAT(//10X,44HDEFINING FREQUENCIES NOT IN ASCENDING ORDER.)
```

| | | |
|---|---|---|
| 434 | | GO TO 910 |
| 435 | 560 | WRITE(IPR,5) |
| 436 | 5 | FORMAT(//10X,26HIMPOSSIBLE FILTER REQUEST.) |
| 437 | 910 | STOP 7 |
| 438 | | END |

The following comments refer to the above list.

Lines 159 and 160 identify the subroutine and define the names of the argument list.

Lines 162 to 166 allocate and define the storage for arrays used in the program.

Lines 199 to 204 initialize parameters used later. CONST1 and CONST2 are values used in calculating the optimum truncation length of the digital filter. They are not used (delete) in FILCOC and FILCOM versions. IPR is a logical output unit. GAIN is a scale factor depending on the ISI sample interval. The GAIN in the FILCOM version is either 0.9 or 1.35, respectively.

Line 205 converts the sample interval to floating point.

Lines 206 through 208 calculate three parameters which are used in FILCOO and not in other versions (again, delete these statements).

Line 209 calculates upper frequency limit in Hz (Nyquist frequency).

Lines 210 to 218 initialize filter parameters. ITYPE equal to zero insures a bandpass filter while zeros in the F5 through F8 storage amount to the same.

Lines 222 through 288 are essentially a series of statements of which only a very few pertain to the bandpass filter used in MIDAS and those that are in fact executed merely check to see if the frequencies specified are in an ascending order. The execution sequence is essentially the following. Line 222 will find IF5 equal to zero and go to line 224. Lines 224 and 225 will not transfer the execution sequence (assuming good data). Line 226 will detect ITYPE of zero and go to line 241. Line 241 will find a non-zero IF4 and go to line 245. Line 245 makes sure that F2 is smaller than F3. Next, line 246 will find F3 less than F4 and go to line 249. Line 249 checks F4 relative to the Nyquist frequency and line 250 transfers execution to line 291.

Lines 291 and 292 calculate a scaling factor which is common to all three versions.

Lines 293 through 316 are a series of instructions which ultimately establish a value for N. N is the length of the digital filter prior to calculating it. Actually the final digital filter will be 2N+1 in length. But, since it is a symmetrical filter only N+1 values have to be calculated. It is within this series of statements that the difference in the various verions can be found. However, the basic sequence is identical. That is, calculate a parameter, L1, associated with F3 and F4 (see lines 295 to 299). Calculate a parameter, L2, associated with F2 and F1 (see lines 305 to 309). Let N be equal to the larger of the two parameters (see lines 313 to 316). In the FILCOM version L1 and L2 are calculated by the following statement (deleting lines 295 through 299 and 305 through 309 and replacing as indicated will produce FILCOM).

| | | |
|---|---|---|
| 50 | AL1 | = 7100.0/(SI*((3.0*F4−F3)) + 0.5 |
| | L1 | = IFIX(AL1) |
| 80 | AL2 | = 7100.0/(SI*((3.0*F4)−F3)) + 0.5 |
| | L2 | = IFIX(AL1) |

FILCOC differs from both by virtue of a third method of establishing N. Inserting the following statement after line 316 in effect produces FILCOC $$N = 500.0/ISI$$

Lines 317 to 319 finish the scaling factors used to adjust the filter amplitudes in all versions.

Line 320 overrides all other generated values of N and limits the total digital filter to 501 discrete points.

Lines 321 to 331 are common to all versions and involve calling subroutine ORMSBY twice. ORMSBY is the subroutine that generates the discrete 2N+1 digital filter values. The first CALL ORMSBY calculates the filter using the third and fourth design frequencies and returns their contribution in array C which is temporarily stored in array D by the do-loop lines 326 to 328. The second CALL ORMSBY returns the contribution from the first and second design frequencies. The do-loop of lines 330 and 331 combine and scale the two contributions in array C.

Line 332 transfers execution to line 388.

Line 388 calls subroutine HAMM which performs a smoothing operation on the digital filter stored in C.

Lines 393 through 403 sort through the members of the C array and if there are any zero valued elements at the beginning (and because of symmetry at the end, too) the entire array will be shortened and reinitialized.

Lines 411 to 414 initialize the value of FDEL depending on the size of the sample interval.

Line 415 calls subroutine COST1 which computes and plots the amplitude response curve of the digital filter generated in this program.

Line 416 computes the final scale factor.

Lines 417 to 423 invert the digital filter operator if desired, adjust the amplitudes and store the final values in the FILT array.

Lines 424 to 430 will optionally graph the filter operator. This option is made according to the value assigned to IFLAG.

Line 431 returns execution to MAIN.

Description of Program ORMSBY

The subroutine ORMSBY is used to generate the digital filter corresponding to the desired trapezoidal response curve. As previously seen in FILCOO, this requires two calls to the ORMSBY subroutine. The first calculates the contribution associated with filtering out the high frequency components and the second call generates the contribution associated with removing the low frequency components. The combination of the two results in a bandpass filter with a response curve that approximates the input trapezoid. Specifically the digital filter generated is an Ormsby-Ricker symmetric filter having an odd number of points. Consequently, only the first half of the filter plus the midpoint have to be individually computed in order to define the entire filter. The specific arguments for the ORMSBY subroutine are as follows:

N - is the number of data points to be calculated less the midpoint. It represents one-half of the length of the filter less the midpoint.
F1 - is the frequency of the high cut start in Hz.
F2 - is the frequency of the zero response in Hz.
LC - is the length of the total filter and is equal to 2N+1.
C - is the output array containing the digital filter in the first 2N+ members.

The FORTRAN list for program ORMSBY is as follows:

```
128   SUBROUTINE ORMSBY(N,F1,F2,LC,ISI)
129C
130C  THIS SUBROUTINE COMPUTES AN ORMSBY FILTER
131C  LC=2N+1=LENGTH OF FILTER
132C  F1=FREQUENCY OF HIGH CUT START
133C  F2=FREQUENCY OF ZERO RESPONSE
134C  C=OUTPUT ARRAY
135C
136C  CONVERTED FROM CDC TO IBM 360
137C
138C
139C
140C
141   REAL*8 C,D,E
142   COMMON /BURP/ C(600),D(600),E(126)
143   IPR=6
144   PI=3.1415927
145   FAC=2.0*PI
146   LC=2*N+1
147   M=-N
148   DO 10 I=1,N
149   T=.001*(FLOAT(M*ISI))
150   C(I)=((COS(FAC*F1*T)-COS(FAC*F2*T))/(PI*(F2-F1)
      *T**2))/FAC
151   10 M=M+1
152   C(N+1)=F2+F1
153   DO 20 I=1,N
154   K=I+N+1
155   J=N+1-I
156   20 C(K)=C(J)
157   RETURN
158   END
```

The following comments refer to the above list:

Lines 141 and 142 define and identify the arrays used for storage.

Lines 143 through 147 initialize values to be used later.

Lines 148 through 151 loop on the first N members of the filter generating the amplitude value at each point.

Line 152 calculates the value of the digital filter at the midpoint.

Lines 153 through 156 finish the digital filter computation by virtue of it being symmetric.

Line 157 returns execution to FILCOO.

Description of Program HAMM

Subroutine HAMM performs a mathematical smoothing operation on the Ormsby digital filter. The input to this subroutine is essentially the output of the Ormsby calculation. Array C is the digital filter and LC is the length of the filter in terms of the number of points. The FORTRAN list for HAMM is included below. Briefly, after defining the arrays and initializing two parameters lines 119 and 120 perform the smoothing on the first N+1 points. Symmetry is again used to define the second half of the operator and the execution is returned to FILCOO.

```
105   SUBROUTINE HAMM (LC)
106C  HAMM APPLIES HAMMING SMOOTHING TO
      THE C ARRAY
107C  C INPUT ARRAY,OUTPUT ARRAY
108C  LC=LENGTH OF C ARRAY
109C
110   REAL*8 C,D,E
111   COMMON /BURP/ C(600),D(600),E(126)
112C  CONVERTED FROM CDC TO IBM 360
113C
114C
115C
116C
117   N=(LC1)/2+1
118   FAC=.5*3.1415927/FLOAT(N-1)
119   DO 10 I=1,N
120   10 C(I)=C(I)*(.92*(COS(FAC*FLOAT(N-I)))**2+.08)
121   M=N-1
122   DO 20 I=1,M
123   K=N+I
124   J=N-I
125   20 C(K)=C(J)
126   RETURN
127   END
```

Description of Programs COST1, GRAF3, and GRAPH1

The three programs COST1, GRAF3, and GRAPH1 are subroutines that generate visual displays of intermediate function found in a MIDAS computation. As such they are, at the discretion of the user, optional but are included here for completeness. In general, COST1 and GRAF3 are used to create a visual printout of the response curve of the digital filter in the frequency domain. This amplitude response curve should approximate the desired trapezoidal response curve desired and the deviation will be a visual representation of the source of numerical error associated with the particular digital filter. As such the printout serves as an aid in detecting arithmetic truncation problems and the like. Specifically, COST1 computes the cosine transform values of the digital filter stored in the C array and stores them in array E. GRAPH3 plots the E array in a simulated variable area. In general, GRAPH1 is a subroutine that plots the digital filter operator itself. Because of the noncriticality of these routines to the understanding of MIDAS a detailed analysis of each step is omitted. However, the following FORTRAN lists can be used in conjunction with the previous programs and a skilled programmer can easily convert these to the particular needs of other users.

```
062        SUBROUTINE COST1 (LF,FDEL,FMAX,SFN,ISI,IFLAG,IPR)
063C       COST1 COMPUTES THE COSINE XFORM OF THE C ARRAY IN STEPS OF
064C       FDEL.
065C       LF=LENGTH OF C ARRAY
066C       ISI=INPUT SAMPLE INTERVAL
067C       FMAX=UPPER FREQUENCY LIMIT
068C       E=OUTPUT ARRAY
069C       LE=LENGTH OF OUTPUT ARRAY
070        REAL*8 C,D,E
071        COMMON /BURP/ C(600),D(600),E(126)
072C       CONVERTED FROM CDC TO IBM 360
073C
074C
075C
076C
077        IPR=6
078        L=(LF-1)/2
079        SI=FLOAT(ISI)
080        FREQ=0.0
081        LE=FMAX/FDEL+1.
082        FACT=2.0*3.1415927*.001*SI
083        DO 10 J=1,LE
084        XN=FLOAT(-(LF-1)/2)
085        FAC=FACT*FREQ
086        E(J)=0.0
087        I=1
088    20  E(J)=E(J)+C(I)*COS(FAC*XN)
089        XN=XN+1.0
090        I=I+1
091        IF(I.LE.L)GO TO 20
092        E(J)=.002*SI*(E(J)+C(I)/2.0)
093        E(J)=E(J)/(2.0*SFN)
094        FREQ=FREQ+FDEL
095    10  CONTINUE
096        IF (IFLAG .LT. 2) GO TO 30
097    40  WRITE(IPR,1)(LE,FDEL)
098     1  FORMAT(1H1,9X,18HAMPLITUDE RESPONSE,I4,10H VALUES IN,F5.1,11H CPS
099        1STEPS.,//)
100        WRITE(IPR,2)(E(J),J=1,LE)
101     2  FORMAT(5(10X,F10.5))
102    30  CALL GRAF3 (LE,FDEL,ISI,IPR)
103        RETURN
104        END
001        SUBROUTINE GRAF3(LE,FDEL,ISI,IPR)
002C
003C       GRAF3 GRAPHS THE E ARRAY IN A SIMULATED VARIBLE AREA.
004        REAL*8 C,D,E
005        COMMON /BURP/ C(600),D(600),E(126)
006        DATA P/ZC1/,B/Z5C/,F/Z60/,G/Z40/
007        LOGICAL*1 IPRINT(126),G,B,F,P
008C
009C       CONVERTED FROM CDC TO IBM 360
010C
011C
012C
013C
014        IPR=6
015        WRITE(IPR,3)
016     3  FORMAT(1H1,9X,28HAMPLITUDE RESPONSE OF FILTER)
017        WRITE(IPR,5)(ISI)
018     5  FORMAT(10X,16HSAMPLE INTERVAL=,I3,4H MS.,////)
019        IF(LE.LE.126) GO TO 10
020        LE=126
021    10  YDELTA=.03333333
022        YCOUNT=1.0333333333
023        ASCALE=1.1
024        ICOUNT=0
025        DO 30 J=1,30
026        YCOUNT=YCOUNT-YDELTA
027        DO 40 I=1,LE
028        IF(E(I).GE.YCOUNT) GO TO 50
029        IPRINT(I)=G
030        GO TO 40
031    50  IPRINT(I)=P
032    40  CONTINUE
033        ICOUNT=ICOUNT+1
```

```
034          IF(ICOUNT.EQ.1) GO TO 70
035          WRITE(IPR,1)(IPRINT(I),I=1,LE)
036        1 FORMAT(4X,126A1)
037          IF(ICOUNT.EQ.3) GO TO 90
038          GO TO 30
039       90 ICOUNT=0
040          GO TO 30
041       70 ASCALE=ASCALE-.1
042          WRITE(IPR,2)(ASCALE,(IPRINT(I),I=1,LE))
043        2 FORMAT(1H ,F3.1,126A1)
044       30 CONTINUE
045          IDEL=IFIX(FDEL)
046          DO 100 I=1,LE
047          IPRINT(I)=F
048      100 CONTINUE
049          DO 110 I=1,LE,5
050          IPRINT(I)=B
051      110 CONTINUE
052          WRITE(IPR,1)(IPRINT(I),I=1,LE)
053          DO 120 I=1,LE,5
054          IPRINT(I)=IDEL*(I-1)
055      120 CONTINUE
056          WRITE(IPR,4)(IPRINT(I),I=1,LE,5)
057        4 FORMAT(2X,I3,3X,25(I3,2X))
058          WRITE(IPR,6)
059        6 FORMAT(10X,14HFREQUENCY-----)
060          RETURN
061          END
439          SUBROUTINE GRAPH1(L,IPR,C)
440C         GRAPH THE OPERATOR
441C
442          REAL*4 C(1),MIN,MAX,INTER,IDIF,KSCALE,ISCALE,KLOW,KHIGH
443C
444C
445          LOGICAL * 1 LINE(113)/113*' '/, SLINE(113)/'A',55*' ','T',55*' '
446         *          ,'A'/, AMP(36)/'           AMPLITUDE
447         *'/,        LLINE(113)/'A---T---T---T---T---T---T---T---
448*        *T---T---T---T---T---T---T---T---T---T---T---T---T---T-
449         *--T---A'/, AST/'*'/
450C
451          GCORRE = 0
452          CCORRE = 0
453C
454C------ M = NUMBER OF ELEMENTS TO GRAPH
445          M = 2 * L + 1
456C------ CALCULATE GRAPH CORRECTION (GCORRE) AND C ARRAY CORRECTION
457C------ (CCORRE)
458          IF (M - 113) 120,150,130
459      120 GCORRE = 56 - L
460          GO TO 150
461      130 CCORRE = L - 56
462          M = 113
463C-------- FIND MIN AND MAX VALUES
464      150 MIN = C(1+CCORRE)
465          MAX = MIN
466      180 DO 250 I=2,M
467          INTER = C(I+CCORRE)
468          IF (INTER .GE. MIN) GO TO 230
469          MIN = INTER
470          GO TO 250
471      230 IF (INTER .LE. MAX) GO TO 250
472          MAX = INTER
473      250 CONTINUE
474C------ FIND BEST SCALE FACTOR
475          IDIF = MAX - MIN
476          XCON = IDIF / 35 + .00009
477          ICON = XCON * 10000
478          ACON = ICON
479          KSCALE = ACON / 10000.
480          KHIGH = MIN - .00001 + 35 * KSCALE
481C-------- WRITE HEADING
482          WRITE (IPR,6000)
483C-------- NOW IT IS TIME TO OUTPUT GRAPH
484          DO 570 I=1,36
485          IF (I .EQ. 36) GO TO 470
486          CALL MOVE(1, LINE(1), SLINE(1), 113)
487          GO TO 480
488      470 CALL MOVE(1, LINE(1), LLINE(1), 113)
489      480 DO 510 K=1,M
490          IF ((KHIGH .GE. C(K+CCORRE)) .AND. (C(K+CCORRE) .GT. (KHIGH -
491         * KSCALE))) LINE(K+GCORRE) = AST
492      510 CONTINUE
```

```
493         IF (((I − 1)/5) * 5 .NE. (I − 1)) GO TO 550
494         WRITE (IPR,6010) AMP(I), KHIGH, LINE
495         GO TO 560
496   550   WRITE (IPR,6020) AMP(I), LINE
497   560   KHIGH = KHIGH − KSCALE
498   570   CONTINUE
499         WRITE (IPR,6030)
500         RETURN
501C------- OUTPUT FORMATS
502   6000 FORMAT('1',T65,'FILTER OPERATOR'//)
503   6010 FORMAT(T4,A1,T7,F8.4,T16,113A1)
504   6020 FORMAT(T4,A1,T16,113A1)
505   6030 FORMAT(T15,'56 52 48 44 40 36 32 28 24 20 16 12 8 4
506        1 0 4 8 12 16 20 24 28 32 36 40 44 48 52 56'//T69
507        2 ,'SAMPLES')
508        END
```

Description of Program DAFD

Having generated the digital bandpass filter which are to be used in separating the seismic traces into components, the MAIN program will call subroutine DAFD which controls and performs essentially all of the computations. As previously stated, what is presented here is essentially an unedited version of the programs that are used by applicant. As such they are still in a state of flux and some optional features may not be operative. But in no way does this affect the operability of the programs or the understanding of MIDAS. For example, lines 297 through 313 including the CALL BKSPT of line 311 merely involves a restart logic which is unique to the present inventor's SIS. The major portion of DAFD which is important to the understanding of MIDAS starts at line 314 which begins an overall processing loop which brings in the seismic traces one at a time, filters each and scales them as a function of time and frequency in a manner that compensates for amplitude decay. This overall processing loop terminates at line 158 and within it is a do-loop which iterates over the filter. Within this do-loop are calls to a series of subroutines that perform the calculations. The FORTRAN listing with detailed analysis is as follows:

```
258         SUBROUTINE DAFD (N,FILT,F,INI,IFOR,IWL,IPONT,L,ISI,NTP,IST)
259         DIMENSION F(10),L(10),FILT(501,10),OUT(6065),WORK(6135),
260       1 I2OUT(6028)
261         DIMENSION OUTBUF(6014)
262         INTEGER*2 I2OUT
263         EQUIVALENCE (OUTBUF(1),I2OUT(1))
264         REAL*8 CCW(3),OCW(8)
265         COMMON IWORK
266         EQUIVALENCE (IBUF(1),KBUF(1),JBUF(101),RBUF(51),
267       1 WORK(301),IWORK(601))
268         INTEGER*2 IBUF(6028),JBUF(6128),IWORK(12628)
269         DIMENSION KBUF(6014),RBUF(6064)
270         REAL*8 SMYVFX(2),SMVXCW(6)
271         REAL*4 CHAD(3) / Z44000000,Z40800000 , Z40800000/
272         COMMON / INDEX/ NSI,IGTG,IGIG,MSI,FOLD,ISP,ISPINC,ISPG,IDV
273         COMMON / W / DIST(512)
274         IRX = 0
275         NDSI = 2 * NSI
276C
277C      * * NOW - - COMPUTE THE JOB CONSTANT PARAMETERS NEEDED * * * *
278         MNW = IWL / (2 * ISI)
279         MNSW = 2 * MNW + 1
280         AMNSW = MNSW
281         MPW = (MNSW + 1) / 2
282         VAL = (IPONT * MNSW * 40.94)
283         DIV = 1. / N
284         IPR = 6
285         I256 = 2 * INI + 56
286         INI28 = INI + 28
287         INI314 = INI + 314
288         LUI = 3
289         LUO = 8
290         CALL APBLD(75,64,24,SMYVFX,SMVXCW,OUTBUF(15),INI,4,0,
291       1 OUTBUF(15),INI,4,0,DIV,1,0,0)
292         CALL APBLD(67,0,24,SMYVFX(2),SMVXCW(4),I2OUT(29),INI,2,192,
293       1 CHAD,3,4,0,OUTBUF(15),INI,4,0)
294         CALL APBLD(35,0,16,CCW(1),OCW(1),WORK(INI314),INI,−4,0,
295       1 IBUF(INI28),INI,−2,192)
296C
297         IDISK = 42
298         IZERO = 0
299         IREAD = 1
300         IF(IFOR .EQ. 2 .OR. IFOR .EQ. 4) IREAD = 101
301         IF(IFOR .GT. 4 .OR. IFOR .LE. 0) IREAD = 101
302         IF(IST .EQ. 0) GO TO 45
303         NIT = 0
```

-continued

```
304         CALL RTAPE(LUO,JBUF(IREAD),NIT)
305      40 NIT = 0
306         CALL RTAPE(LUO , JBUF(IREAD),NIT)
307         NIT = 0
308         CALL RTAPE(LUI , JBUF(IREAD),NIT)
309         IF(NIT .EQ. 0) GO TO 80
310         IF(JBUF(106) .NE. IST) GO TO 40
311         CALL BKSPT(LUO,1)
312         IF(IFOR .EQ. 1 .OR. IFOR .EQ. 3) GO TO 55
313         GO TO 48
314      45 NIT=0
315         CALL RTAPE(LUI , JBUF(IREAD) , NIT)
316         IZERO = 0
317         IF(NIT.EQ.0) GO TO 80
318      48 CALL MOVE(1,IWORK(101),IBUF(1),56)
319         IF(IFOR.NE.0) GO TO 47
320         IFOR=(NIT−56)/INI
321         INI*IFOR + 56
322         IF(IBYTES.EQ.NIT) GO TO 47
323         WRITE(IPR,46)NIT,INI
324      46 FORMAT(5X,'FORMAT CALCULATION ERROR, NUMBER OF BYTES READ =',I5,'N
325        *UMBER OF SAMPLES = ',I5)
326         CALL ABEND(46)
327      47 IF(IFOR.NE.4) GO TO 55
328C
329         CALL BCFLOT (KBUF(15),RBUF(65),INI)
330C
331C       * * NOW SET RI, TRACE, AND STATIC FOR ALL FORMATS (CK.EQUIV.) * *
332C
333      55 IRI = IBUF(6)
334         ITR = IBUF(7)
335         IF(DIST(ITR) .NE. 0.) JBUF(117) = DIST(ITR)
336         IF(DIST(ITR) .NE. 0.) JBUF(119) = DIST(ITR)
337C
338C        SET INDEX IN TRACE HEADER
339C
340         IF(IRX .EQ. 0) IRX = JBUF(106)
341         IF(NSI .EQ. 0) GO TO 2690
342         JBUF(109) = (JBUF(106) − IRX) * NSI + 1
343         JBUF(118) = JBUF(109) + MSI*(JBUF(107) − 1)
344         IF(IGTG .GT. 0 .AND. JBUF(107) .GT. IGTG)
345       1 JBUF(118) = JBUF(118) + MSI * IGIG
346         JBUF(122) = (JBUF(109) + JBUF(118)) / IDV
347         JBUF(109) = JBUF(109) * 10
348         JBUF(110) = JBUF(106)
349         JBUF(111) = JBUF(107)
350    2690 CONTINUE
351         IF(ISP .EQ. 0) GO TO 2685
352         JBUF (127)=(JBUF (106)−IRX)*ISPINC + ISP
353         JBUF(108) = 0
354         KSP = (JBUF (122) − ISPG) / NDSI * ISPINC + ISP
355         M = (KSP − ISP) / ISPINC * NDSI + ISPG
456         IF(M .EQ. JBUF(122)) JBUF(108) = KSP
357         IF(KSP .LT. ISP) JBUF(108) = 0
358    2685 CONTINUE
359C
360         CALL MOVE (0,OUTBUF(15),0,4*INI)
361         CALL MOVE(1,OUTBUF(1),IBUF(1),56)
362         IF(IBUF(25) .EQ. 30000) GO TO 75
363         IF(IFOR .GT. 2) GO TO 60
364         CALL APEX(1,CCW(1))
365    9126 FORMAT('1' / (5X,10F10.2))
366    9127 FORMAT ('1' / (5X,10I10))
367C
368C        LOOP ON FILTERS
369C
370      60 DO 9000 IBMI=1,N
371         IFL = (L(IBM1) − 1) / 2
372         KWORDS = INI + IFL
373         I4W = 315 − IFL
374         CALL MOVE(0,WORK(I4W),0,4*IFL)
375         CALL APBLD(115,0,24,CCW(3),OCW(5), OUT(65),INI,4,0,WORK(I4W)
376       1 KWORDS,4,0,FILT(1,IBM1),L(IBM1),4,0)
377         CALL APEX(1,CCW(3))
378         VAL1 = VAL * F(IBM1)
379         IZERO = 0
380         CALL DAFNAP(OUT(65),OUTBUF(15),VAL1,INI,MNSW,AMNSW,NON,IZEE
381         IF(IZERO .EQ. 1) GO TO 75
382C
383    1002 FORMAT(5X,' RI', I4,' PROCESSED')
384    9000 CONTINUE
385         CALL APEX(1,SMYVFX)
```

```
386       75  IF(ITR .NE. NTR) GO TO 9001
387           WRITE(6,1002) IRI
388           WRITE(IDISK,90128) IRI , IFOR
389           BACKSPACE IDISK
390     9001  CALL WREC(LUO,OUTBUF,I256)
3919    0128  FORMAT(2A4)
392           GO TO 45
393       80  WRITE(IPR,1003)
394     1003  FORMAT(5X,' EOF ON INPUT TAPE')
395           CALL LBCLOS(3,8)
396           RETURN
397C
398           END
```

The following comments refer to the above listing.

Line 258 identifies the subroutine DAFD and the respective names of the variables transferred between the subroutine and the calling program. The list of transferred variables includes:

| | | |
|---|---|---|
| N | - | The number of filters. |
| FILT | - | The array containing the filter operator. |
| F | - | The relative weighting of each N filter according to the area of the idealized response curve wherein the first filter is assigned the value of one. |
| INI | - | Parameter used to identify the number of samples in the input header. |
| IFOR | - | Parameter used to identify the FORMAT of the seismic trace data. |
| IWL | - | The window length in milliseconds selected by the user or defaulted to 500. |
| IPONT | - | The percent scaling of the window times 100 initially selected by the user or defaulted to 15. |
| L | - | The array of values of M calculated by "FILCO" for each of the N filters (to be used for simulated variable-area amplitude response curve). |
| ISI | - | The sample interval between seismic data points expressed in milliseconds. |
| NTR | - | Parameter used as a processing aid. Program will print a message indicating the record (set of traces) that has just been processed (see lines 386 to 389). |
| IST | - | Parameter used in the automatic restart. |

Lines 259 through 273 define variables, array dimensions and their nature for use in the subroutine.

Lines 274 and 275 define parameters that may or may not be used.

Lines 278 to 281 calculate in integer mode the number of sample points in the chosen window such that it is an odd number and stores this number in both floating point and integer mode plus the number of points before and after the midpoint of the window.

Line 282 calculates the scaling factor as a product of the input percentage the number of data points in the window and a constant. If a user decides to use the default provision this scaling factor becomes 307,664.1.

Line 283 sets DIV equal to the reciprocal of the number of filters.

Lines 284 to 289 set up and initialize various other parameters including I/O logical units IPR, LUI and LUO.

Lines 290 to 295 call subroutine APBLD which build instruction to an external array processor.

Lines 297 through 313 establish the restart logic to be used if the computer goes down.

Line 314 begins the overall processing loop which extends to line 392. Specifically it sets NIT equal to zero. It is within this loop that essentially all computations take place.

Line 315 calls subroutine RTAPE which reads in the first seismic trace. Again the third variable, NIT, will return the number of bytes read.

Line 316 set IZERO equal to zero.

Line 317 checks to see if zero bytes were read. If so, then all seismic traces have been processed and the execution sequence exists the loop by going to statement 80, line 293.

Lines 318 to 329 check the actual format of the seismic trace and prepare it for further processing. If there is a format calculation error the execution will terminate with a CALL ABEND at line 326. Subroutine BCFLOT of line 92 changes the format of the data from integer 4 to real 4.

Lines 333 to 336 set the values and distances for all formats.

Lines 340 to 358 set the index in the trace header.

Lines 360 and 361 exchange data between arrays.

Line 362 checks to see if the trace is a dead trace. If so the mathematical computations are bypassed and the process loop continues to the next trace.

Lines 363 and 364 determine if the data is in the proper format for further computation and, if not, subroutine APEX performs a format conversion.

Lines 370 to 384 are a do-loop that loops on the N filters. It is within this do-loop that essentially all of the mathematical operations representing multidimensional amplitude scaling of the seismic trace are performed.

Lines 371 to 377 filter the seismic trace.

Lines 371 to 374 set up the parameters and data arrays containing the seismic trace which will be filtered by the filter operators.

Lines 375 and 376 are a call to subroutine APBLD which generates the OCW's and the CCW's necessary to access the array processor. WORK contains the input seismic trace and FILT contains the smoothed Ormsby filter operator. OUT will return the output of the filtered trace, the frequency band-limited component trace.

Line 377 is a call to subroutine APEX. This call will execute the array processor instruction generated by ABBLD. At this point the array processor will perform the digital filtering of the seismic trace. In other words, the convolution of the filter operator and the seismic trace will be performed at this point, outside the computer, on separate equipment.

Line 378 further refines the overall scaling to account for relative differences in bandpass sizes.

Line 379 sets IZERO to zero.

Line 380 calls subroutine DAFNAP which performs the digital amplitude scaling along the seismic trace accounting for the amplitude attenuation as a function of time. The component trace to be amplified is stored in OUT while the OUTBUF is an accumulative buffer which retains the sum of the MIDAS processed component traces. After looping over N filters, OUTBUF will contain the summed multidimensional amplitude scaled seismic trace.

Line 381 exits the loop and bypasses a final scaling of line 385 if IZERO is returned by DAFNAP as being equal to one.

Line 385 is a call to APEX which performs a final scaling accounting for the number of filters used and a reformatting of data for output.

Line 390 calls subroutine WREC which at this point outputs the desired MIDAS processed seismic trace on tape for further processing or display.

Line 392 loops back to line 314 such that the next seismic trace can be read and processed.

Lines 393 and 394 are executed after the last seismic trace has been processed. They indicate the end of input data.

Line 395 calls subroutine LBCLOS which closes the I/O tapes.

Line 396 returns the execution sequence to MAIN.

Description of Program DAFNAP

Subroutine DAFNAP is a program which was written in IBM assembler language and is reproduced below in that form as routinely used. Since assembler language is less readily amenable to stepwise analysis the program will be described in terms of general overall mathematical steps and consequences with reference to specific arrays and names in the program. The arguments of the CALL DAFNAP statement and their identity are as follows:

| | |
|---|---|
| OUT | - is the input array that contains the frequency bandpass limited component trace. |
| OUTBUF | - is the accumulative array which will continue to store the sum of the MIDAS processed contributions from each component trace. After looping over N filters this OUTBUF will contain the desired multidimensional amplitude scaled seismic trace except for a minor overall scaling factor to account for size of N. |
| VAL1 | - is the same scaling factor as VAL1 in DAFD. It includes contributions which account for different size frequency ranges from filter to filter as well as overall size scaling of the amplitude values. |
| INI | - is the length of OUT in terms of the number of data points. |
| MNSW | - is the number of points over which the average amplitude is to be calculated (window length). |
| FMNSW | - is the floating point counterpart of MNSW and is named AMNSW in DAFD. |
| HMNSW | - corresponds to MNW in DAFD and is half of MNSW in integer 4. |
| IERCOD | - is either equal to zero or one and corresponds IZERO in DAFD. It is returned to DAFD with a zero value only if OUT comes in as all zero. It is then used by DAFD to flag the end of seismic data input. |

DAFNAP is a program which performs an empirical time-variant amplitude scaling on a component seismic trace by using a "running window." The length of this window expressed in milliseconds is defaulted to 500 in cases where the user does not specify its length. DAFD converts the initial window length to the nearest (rounding up) odd number of sample intervals and this is the value that is stored in MNSW. The actual component seismic trace that is to be amplitude scaled enters DAFNAP as the OUT array. The program starts at the earliest in time end of OUT and searches for the first non-zero element. Having found it, the starting point for the application of the running window is defined. The program then proceeds to sum the absolute values of the next MNSW elements of the OUT array to calculate the sum of the absolute amplitudes and stores this sum as AAA. This AAA is then treated as the average absolute amplitude across that time window and is related to the real average by a constant multiple equal to the number of points in the window. This multiplication has already been accounted for in scaling factor VAL1. Thus scaling factor VAL1 is divided by AAA and stored as variable X. X is considered to be the required amplitude scaling factor for the midpoint of that particular window. The actual scaling of the amplitude value stored in the OUT array element corresponding to midpoint of the window is performed by multiplying; i.e., OUT*X. This represents the MIDAS contribution of the particular component trace at that midpoint. Thus it is stored in the OUTBUF element corresponding to that midpoint. However, this storage is a cumulative operation, thus in reality is added to whatever is already there by virtue of previous iterations using different filters on the same trace; i.e., different component traces. Hence, the overall symbolic representation OUTBUF=OUTBUF+OUT*X. This process in essence is the heart of the MIDAS scaling. It is continued to the next OUT array element by shifting the entire window out in time by one unit. This is done by adding the next sequential OUT array element to the previous AAA sum and subtracting from the AAA sum the value of the OUT element representing the earliest end of the window. This inherently creates a smoothing effect on the amplitude scaling and also is the means by which the time dependency of decay is accounted for. The process is repeated over the entire trace by stepping the window out in time, sample point by sample point, until the entire component trace is scaled. Since this process as described involves the midpoints of the windows there will be a leading and trailing half window which has not been scaled. Since the term AAA is allowed to change as a function of time it is logical to extrapolate the AAA at both ends. DAFNAP makes this extrapolation by using the first AAA over the first half window and the final AAA over the last half window. OUTBUF will continue to cumulatively store contributions to the MIDAS trace until all N filters have been used on the original unscaled seismic trace. At this point the total MIDAS processed trace is further scaled to account for the number of filters and becomes the output to tape via subroutine WREC. The OUTBUF is at this reinitialized to zero. The next seismic trace is read and begins to be processed. This process continues until DAFNAP detects all zeros on input and concludes that no more seismic traces are to be amplitude scaled.

```
001DAFNAP    START      0
002*************************************************************  *******************
003****                  LANGUAGE-IBM OS ASSEMBLER
004****                  LEVEL  —F
```

```
005****          COMPUTER-IBM 370/165/168
006****          PROGRAMMER-GEORGE FRANCIS
007****          DATE *JUNE,1974
008****
009****          FORTRAN CALL IS----
010****          CALL DAFNAP (OUT,OUTBUF,VAL1,INI,MNSW,FMNSW,HMNSW,
011****          IERCOD)
012****
013****          WHERE
014****          OUT = R*4 ARRAY,HOLDS FILTERED TRACE ON INPUT
015****          OUTBUF = R*4 ARRAY,HOLDS RESULTANT ARRAY
016****          WHICH IS BASICALLY OUTPUT = OUTBUF + ((VAL1
017****          /AAA)*OUT). AAA IS AV.AB. VALUE OVER WIND
018****
019****          VAL1 = A R*4 CONSTANT INPUT,USED AS DEFINED
020****          UNDER OUTBUF.
021****          INI = LENGTH OF OUT ARRAY.
022****          MNSW = NO.PTS.OVER WHICH AAA IS COMPUTED
023****          PMNSW = FLOATING MNSW
024****          HMNSW = HALF MNSW IN I*4
025****          IERCOD = SHOULD BE PASSED IN AS 0,IF NO NON-ZERO
026****          SAMPLES FOUND, WILL BE PASSED BACK AS 1.
027*********************************************************************************
028R1     EQU    1
029R2     EQU    2
030R3     EQU    3
031R4     EQU    4
032R5     EQU    5
033R6     EQU    6
034R7     EQU    7
035R8     EQU    8
036R9     EQU    9
037R10    EQU    10
038R11    EQU    11
039R12    EQU    12
040R13    EQU    13
041R14    EQU    14
042R15    EQU    15
043BASE   EQU    15
044       SAVE   (14,12),,*
045       USING  DAFNAP,BASE
046       ST     R13,SAVE13
047       LR     R4,R13 GET CALLING SAVE AREA ADD IN REG. 4
048       LA     R13,SAVE
049       ST     R13,8(0,R4) MY SAVE AREA ADD. INCALLING SAVE AREA
050       ST     R4,4(0,R13) ADD. OF CALLING SAVE AREA IN MY AREA.
051       LA     R2,PARMLST
052       MVC    0(32,R2),0(R1)
053       L      R2,VAL1 PUT ACTUAL CONSTANT VALUE IN VAL1
054       L      R2,0(R2)
055       ST     R2,VAL1
056       L      R2,INI GET ACTUAL LENGTH OF OUT IN INI
057       L      R2,0(R2)
058       ST     R2,INI
059       L      R2,MNSW GET ACTUAL WINDOW LENGTH IN MNSW
060       L      R2,0(R2)
061       ST     R2,MNSW
062       L      R2,FMNSW PUT FLOATING MNSW VALUE IN FMNSW
063       L      R2,0(R2)
064       ST     R2,FMNSW
065       L      R2,HMNSW PUT HALF MNSW VALUE IN HMNSW
066       L      R2,0(R2)
067       ST     R2,HMNSW
068       L      R1, = F'0'
069       L      R4, = F'4' PUT INCREMENT IN R4
070       L      R2,OUT GET ADDRESS OF OUT
071       L      R5,INI GET LENGTH OF OUT, IN BYTES, −4, FOR BXLE
072       SLL    R5,2
073       S      R5, = F'4'
074       LE     0, = F'0'
075LOOP1  CE     0,0(R1,R2) GET FIRST NON-ZERO VALUE INDEX OF OUT ARRAY
076       BNE    FOUNDI
077       BXLE   R1,R4, LOOP1
078       B      NOJNDX
079FOUNDI ST     R1, SAVEI SAVE BYTE INDEX OF FIRST NON-ZERO ELEMENT
080       L      R4, = F'−4' NOW FIND BYTE INDEX OF LAST NON-ZERO ELEMENT
081       LR     R1,R5
082       L      R5, = F'0'
083LOOP2  CE     0,0(R1,R2)
084       BNE    FOUNDJ
085       BXLE   R1,R4, NOJNDX
086       B      LOOP2
```

| | | |
|---|---|---|
| 087 NOJNDX | L | R5,IERCOD |
| 088 | L | R4, = F'1' |
| 089 | ST | R4,0(R5) |
| 090 | B | XIT |
| 091 FOUNDJ | ST | R1, SAVEJ |
| 092 | L | R1,SAVEI GET BYTE ADDER FOR I PLACE IN OUT INTO R1 |
| 093 | L | R4,OUT GET OUT ADDRESS IN R4 |
| 094 | L | R2, = F'4' INCREMENT FOR BXLE IN R2 |
| 095 | L | R3,MNSW BUILD COMPARAND FOR BXLE |
| 096 | SLL | R3,2 WHICH IS SAVEI + (4*MNSW−4) |
| 097 | AR | R3,R1 |
| 098 | S | R3, = F'4' |
| 099 | LE | 0, = F'0' ZERO SUM REGISTER |
| 100 LOOP3 | LE | 2,0(R4,R1) GET OUT VALUE |
| 101 | LPER | 4,2 LOAD POSITIVE |
| 102 | CE | 4,TOOBIG |
| 103 | BC | 2, NOJNDX |
| 104 | AER | 0,4 SUM |
| 105 | BXLE | R1,R2, LOOP3 DO FOR MNSW VALUES |
| 106 | STE | 0,SUM STORE SUM FOR LATER USE |
| 107 | LE | 4,VAL1 |
| 108 | DER | 4,0 X = VAL1/AAA |
| 109 | L | R1, SAVEI GET BYTE ADDER FOR I PLACE IN OUT INTO R1 |
| 110 | L | R3, HMNSW BUILD COMPARAND FOR BXLE TO APPLY X FOR |
| 111 | SLL | R3,2 FIRST WINDOW, TO HALF WINDOW LENGTH NO. |
| 112 | AR | R3,R1 |
| 113* | | SAMPLES, STARTING WITH I |
| 114 | L | R6, OUTBUF ADDRESS OF OUTPUT SUM ARRAY IN R6, |
| 115* | | NOTE:R4 ALREADY HAS OUT ARRAY ADDRESS. |
| 116 LOOP4 | LE | 0,0(R1,R4) GET OUT VALUE |
| 117 | MER | 0,4 X*OUT |
| 118 NOSTR1 | AE | 0,0(R1,R6) OUTBUF = OUTBUF + X*OUT |
| 119 | STE | 0,0(R1,R6) STORE IN OUTBUF |
| 120 | BXLE | R1, R2, LOOP4 |
| 121 | L | R1, MNSW BUILD COUNTER START FOR BXLE FOR MAJOR |
| 122 | SLL | R1, 2 LOOP, IS SAVEI + (MNSW*4) |
| 123 | A | R1, SAVEI |
| 124* | | R2 HAS 4 AS BXLE INCREMENT |
| 125 | L | R3, SAVEJ R3 WILL BE COMPARAND, IS |
| 126* | | SAVEJ |
| 127* | | R4 HAS OUT ARRAY ADDRESS |
| 128 | L | R5, MNSW R5 WILL BE USED TO POINT TO SAMPLE |
| 129 | SLL | R5, 2 TO BE DROPPED FRIM PREVIOUS ABSOLUTE |
| 130 | LNR | R5, R5 SUMMATION.IS OUT ADDRESS-(MNSW*4) |
| 131 | AR | R5, R4 |
| 132* | | R6 HAS OUTBUF ADDRESS |
| 133 | L | R7, HMNSW R7 SET TO STORE OUTBUF VALUES WHEN |
| 134 | SLL | R7, 2 ADDED TO R1 WILL START STORING AT |
| 135 | LNR | R7, R7 OUTBUF + SAVEI + (MNSW*4) − (HMNSW*4) |
| 136 | LR | R8, R7 |
| 137 | AR | R7, R6 |
| 138 | AR | R8, R4 |
| 139**** | | |
| 140**** | | STARTS MAJOR LOOP |
| 141 | LE | 6, SUM GET PREVIOUS ABSOLUTE SUM |
| 142 BIGLOOP | LE | 0,0(R1, R5) GET OUT VALUE TO DROP |
| 143 | LPER | 2,0 TAKE AB. VALUE TO DROP |
| 144 | SER | 6,2 DROP OUT VALUE |
| 145 | LE | 0,0(R1,R4) PICK UP NEXT VALUE TO ADD IN. |
| 146 | LPER | 2,0 TAKE AB. VALUE TO ADD |
| 147 | CE | 2, TOOBIG |
| 148 | BC | 2, NOJNDX |
| 149 | AER | 6,2 ADD IN 6, WHICH NOW HAS AB.SUM OF NESXT WIND |
| 150 | LTER | 0,6 PUT AS SUM IN 0 |
| 151 | BC | 8, ZERO |
| 152 | LE | 4, VAL1 |
| 153 | DER | 4,0 VAL1/AAA = X |
| 154 | LE | 0,0(R1,R8) GET OUT VALUE |
| 155 | MER | 0,4 OUT*X |
| 156 NOSTR2 | AE | 0,0(R1,R7) OUTBUF = OUTBUF + OUT*X |
| 157 | STE | 0,0(R1,R7) |
| 158 ZERO | BXLE | R1,R2,BIGLOOP |
| 159**** | | |
| 160**** | | DO LAST EXTRAPOLATION |
| 161**** | | |
| 162 | L | R9,HMNSW |
| 163 | SLL | R9,2 RESET COMPARAND |
| 164 | AR | R3,R9 |
| 165 LASTLOOP | LE | 0,0(R1,R8) |
| 166 | MER | 0,4 |
| 167 NOSTR3 | AE | 0,0(R1,R7) |
| 168 | STE | 0,0(R1,R7) |

| | | |
|---|---|---|
| 169 | BXLE | R1, R2, LASTLOOP |
| 170XIT | L | R13, SAVE13 |
| 171 | RETURN | (14,12),T |
| 172* | | |
| 173* | | |
| 174 | DS | 0F |
| 175TOOBIG | DC | X'70100000' |
| 176SAVE13 | DC | F'0' |
| 177SAVEI | DC | F'0' |
| 178SAVEJ | DC | F'0' |
| 179SUM | DC | F'0' |
| 180PARMLST | DS | 0F'0' |
| 181OUT | DS | F'0' |
| 182OUTBUF | DS | F'0' |
| 183VAL1 | DS | F'0' |
| 184INI | DS | F'0' |
| 185MNSW | DS | F'0' |
| 186FMNSW | DS | F'0' |
| 187HMNSW | DS | F'0' |
| 188IERCOD | DS | F'0' |
| 189SAVE | DS | 18F |
| 190 | END | |

Description of Programs BCFLOT, and FSDATE

Subroutines BCFLOT and FSDATE are miscellaneous programs that are routinely used in conjunction with the above programs but again are not considered critical for understanding MIDAS. Their respective listings as routinely used are presented below such that no uncertainty will be induced by calling them in the previous programs. In general BCFLOT converts an integer four format to a real four and FSDATE prints the date of use in a conventional form.

| | | |
|---|---|---|
| 1 * | | |
| 2 * | CALL | BCFLϕT (INPUT,FϕUT,Nϕ.) |
| 3 * | | |
| 4 BCFLϕT | CSECT | |
| 5 | USING | *,15 |
| 6 | STM | 2,8,12(13) |
| 7 | LM | 2,4,0(1) |
| 8 | L | 4,0(4) |
| 9 | LA | 5,4 |
| 10 | LA | 7,LUP |
| 11 LUP | L | 8,0(2) |
| 12 | LPR | 6,8 |
| 13 | LD | 0,FL2 |
| 14 | STD | 0,FL1 |
| 15 | ST | 6,FL1+4 |
| 16 | SWR | 0,0 |
| 17 | AD | 0,FL1 |
| 18 | LTR | 8,8 |
| 19 | BC | 2,*+6 |
| 20 | LNER | 0,0 |
| 21 | STE | 0,0(3) |
| 22 | AR | 2,5 |
| 23 | AR | 3,5 |
| 24 | BCTR | 4,7 |
| 25 | LM | 2,8,12(13) |
| 26 | BR | 14 |
| 27 | DS | 0D |
| 28 FL1 | DC | X'4E00000000000000' |
| 29 FL2 | DC | X'4E00000000000000' |
| 30 | END | |
| 854 | SUBROUTINE FSDATE (D) | |
| 855C | SUBROUTINE TO GIVE A DATE IN | |
| 856C | THE FORM MM/DD/YY. E.G. 04/10/69. | |
| 857C | | |
| 858 | LOGICAL * 1 D(8) | |
| 859 | LOGICAL * 1 SYMBOL,SLASH /Z61/ | |
| 860 | /LOGICAL * 1 HYPEN /Z60/ | |
| 861C | | |
| 862 | SYMBOL = SLASH | |
| 863 | GO TO 300 | |
| 864C | | |
| 865 | ENTRY FHDATE (D) | |
| 866 | SYMBOL = HYPHEN | |
| 867C | | |
| 868 | 300 CONTINUE | |
| 869 | CALL CNDATE (D) | |
| 870 | D(8) = D(6) | |
| 871 | D(7) = D(5) | |
| 872 | D(6) = SYMBOL | |
| 873 | D(5) = D(4) | |
| 874 | D(4) = D(3) | |
| 875 | D(3) = SYMBOL | |
| 876C | | |
| 877 | RETURN | |
| 878 | END | |

Having thus described my invention the following example is presented to illustrate the invention and as such should not be considered unduly limiting.

EXAMPLE

A conventional single-dimensional amplitude scaling computation and a MIDAS computation were performed on the same seismic data derived from a transposed wave-test conducted over the South Jennings Gas Field, Jefferson Davis Parish, La. Single one-pound dynamite charges shot at a depth of 97 feet were used as an energy source. The wave-test seismograms were recorded from a wave-test spread of 24 Walker-Hall Sears, Z-1, Model F seismometers spaced at 10-foot intervals. These particular liquid-damped seismometers did not exhibit parasitics below 200 Hz. The seismic data was prefiltered by a 32 Hz low cut filter having an attenuation rate of 24 db per octave and digitized at 1 ms intervals.

The wave test seismogram was processed through the sequence shown in FIG. 5. This processing consisted of measuring the amplitude decay rate on each reformatted seismic trace. The amplitude decay rates were then averaged. A scale factor for each time was computed based on the average amplitude decay rate. The application of these scale factors compensated for the average amplitude decay observed in the time dimension. The resulting processed seismogram corresponding to the conventional single-dimensional amplitude scaling is displayed in FIG. 7.

A MIDAS type computerized computation was then applied to the same data according to the process sequence shown in FIG. 6. For purposes of separating the seismic traces of the seismogram into band-limited component traces, a set of three filters was selected; namely, a 10-30-40-60, a 40-60-70-90, and a 70-90-120-250 Ormsby filter. The reformatted wave-test seismogram was filtered with each of these three filters. Time-variant amplitude scale factors were computed empirically for each set of band-limited component seismic traces recorded from a common source-to-receiver distance interval. The observed time and source-to-receiver distance dependent amplitude decay was compensated for by applying these scale factors. The three sets of band-limited component seismograms, after filtering and partial compensation for amplitude decay, are displayed respectively in FIGS. 8, 9, and 10. Finally, the three sets were summed into one set of seismograms and plotted. This summation compensated for amplitude decay as a function of frequency and completed the MIDAS processing. The results are shown in FIG. 11. The amplitudes and frequency content of this output data are well balanced at all time and source-to-receiver distances. Additionally, the high-frequency content has been expanded significantly.

FIG. 12 is a comparison of a harmonic analysis of one trace after conventional single-dimensional processing with a harmonic analysis of the same trace after MIDAS processing. The spectral amplitudes of the conventionally processed trace are within 6 db of the maximum amplitude between approximately 12 and 37 Hz. Spectral amplitudes of the MIDAS processed trace are within 6 db of the maximum amplitude between approximately 20 and 94 Hz, further emphasizing that MIDAS results in an increase in the frequency bandwidth of more than one octave.

I claim:

1. An apparatus for improving seismic resolution comprising:
   (a) means for detecting and recording seismic data as a function of time over a frequency range in excess of at least 20 to 100 Hz with sufficient dynamic range to preserve the high frequency signal components of said frequency range,
   (b) means for multidimensional amplitude scaling of said seismic data in the time domain, wherein said amplitude scaling is performed on and the amount of said amplitude scaling is determined from a component seismic trace defined as a function of time being characteristic of a single source-to-receiver distance and a subcomponent frequency range derived by zero-phase-shift filtering, thereby creating a high frequency extension of said seismic data resulting in improved high resolution seismic data, and
   (c) means for outputting said multidimensional amplitude scaled seismic data, thus producing a multidimensional amplitude scaled seismic record.

2. An apparatus of claim 1 wherein said means for multidimensional amplitude scaling of said seismic trace includes:
   (a) means for separating said seismic trace into a plurality of frequency band-limited component traces with zero phase shift;
   (b) means for generating a time-variant amplitude scale factor for each of said component traces;
   (c) means for applying said scale factors to said component traces, thus compensating for amplitude decay; and
   (d) means for recombining said scaled component traces thus recovering a multidimensional amplitude scaled seismic trace.

3. An apparatus of claim 2 wherein said detecting means is a geophone or hydrophone in combination with an analog-to-digital converter means prior to said recording means.

4. An apparatus of claim 3 wherein said means for separating said seismic trace divides the frequency range into from two to about fifty essentially adjacent and non-overlapping frequency bandpasses none of which are less than about 5 Hz wide.

5. An apparatus of claim 4 wherein said frequency range is divided into from two to about ten bandpasses.

6. An apparatus of claim 1 wherein said means for multidimensional amplitude scaling is a computerized system comprising:
   (a) a memory for storing seismic data and storing a sequence of program instructions which operate on said data, wherein said sequence of program instructions include:
      (i) means for zero phase shift filtering a seismic trace into a plurality of frequency band-limited component traces;
      (ii) means for computing a time-variant amplitude scale factor for each of said component traces;
      (iii) means for applying said scale factors to said component traces, thus compensating for amplitude decay; and
      (iv) means for summing said scaled component traces, thus recovering a multidimensional amplitude scaled seismic trace;
   (b) an input device for entering seismic traces and seismic data into said memory;
   (c) means for executing said sequence of program instructions; and
   (d) an output device for generating a record of said multidimensional amplitude scaled seismic traces.

7. An apparatus of claim 6 wherein said means for separating said seismic trace divides the frequency range into from two to about fifty essentially adjacent and non-overlapping frequency bandpasses none of which are less than about 5 Hz wide.

8. An apparatus of claim 7 wherein said frequency range is divided into from two to about ten bandpasses.

9. In a process for seismic exploration, the specific improvement comprising:
   (a) detecting and recording seismic data as a function of time over a frequency range in excess of at least 20 to 100 Hz with sufficient dynamic range to preserve the high frequency signal components of said frequency range,
   (b) multidimensional amplitude scaling of said seismic data in the time domain, wherein said amplitude scaling is performed on and the amount of said amplitude scaling is determined from a component seismic trace defined as a function of time being characteristic of a single source-to-receiver distance and a subcomponent frequency range derived by zero-phase-shift filtering, thereby creating a high frequency extension of said seismic data resulting in an improved high resolution seismic data, and
   (c) outputting said multidimensional amplitude scaled seismic data, thus producing a multidimensional amplitude scaled seismic record.

10. A process for improving seismic resolution comprising:

(a) detecting and recording of seismic traces at a plurality of receiver locations as a function of time over a frequency range of at least 20 to 100 Hz with sufficient dynamic range to preserve signal components of said frequency range;

(b) separating each of said seismic traces into a plurality of frequency band-limited component traces by zero-phase-shift filtering;

(c) computing a time-variant amplitude scale factor for each of said component traces;

(d) applying said scale factor to said component traces, thus compensating for amplitude decay;

(e) summing said scaled component traces, thus recovering multidimensional amplitude scaled seismic traces; and (f) outputting said multidimensional amplitude scaled seismic traces as a multidimensional amplitude scaled seismic record.

11. An automatic computer-implemented process for restoring the low frequency components and the high frequency components in seismic traces arising from the reception and recording of traveling waves at a plurality of receiver locations as a function of time over a frequency range in excess of 20 to 100 Hz with sufficient dynamic range to preserve signal components of said frequency range comprising:

(a) automatically separating each of said seismic traces into a plurality of frequency band-limited component traces by zero phase shift filtering;

(b) automatically computing a time-variant amplitude scale factor for each of said component traces;

(c) automatically applying said scale factor to said component trace, thus compensating for amplitude decay; and (d) automatically summing said scaled component traces, thus recovering multidimensional amplitude scaled seismic traces.

12. An automatic computer-implemented process of claim 11 wherein said seismic traces to be multidimensional amplitude scaled are grouped according to source point to receiver distance, said separating is performed such that said component traces span essentially equal and non-overlapping frequency ranges and said computing of said scale factor is done per group of said seismic traces each having a common source point to receiver distance.

13. An apparatus of claim 1 wherein said means for detecting and recording seismic data include:

(a) a set of detectors each dedicated to a specific frequency band, (b) means for prefiltering each of said frequency bands prior to digitization with a low-cut, zero-phase filter to remove the sum of all lower frequency band energy, and (c) means to amplify and digitize each of said prefiltered frequency bands independently thus optimizing the dynamic range.

14. An apparatus of claim 13 wherein said set of detectors is a single detector or group of detectors producing an output of parallel signals each dedicated to a specific frequency band.

15. A process of claim 9 wherein said detecting prior to recording includes:

(a) separating the seismic signal into a plurality of signals each of which is frequency band dedicated, (b) prefiltering each of said frequency band dedicated signals with a low-cut, zero-phase filter to remove the sum of all lower frequency band energies, and (c) amplifying and digitizing each of said prefiltered frequency bands independently thus optimizing the dynamic range.

16. In a process for seismic exploration, wherein amplitude attenuation of the seismic trace is to be corrected as a function of time, frequency and distance, the specific improvement comprising the steps of separating the seismic trace into frequency components by a zero-phase filter, calculating and applying an amplitude scaling function for each of said frequency components in the time domain, summing said scaled frequency components, recovering a partially deconvolved, whitened, high-resolution seismic trace, and displaying said recovered seismic trace as a multidimensional amplitude scaled record.

17. An apparatus for improving seismic resolution comprising:

(a) means for detecting and recording seismic data as a function of time over frequency range of at least 20 to 100 Hz with sufficient dynamic range to preserve signal components of said frequency range, (b) means for multidimensional amplitude scaling of said seismic data in the time domain, and (c) means for outputting said multidimensional amplitude scaled seismic data, thus producing a multidimensional amplitude scaled seismic record.

* * * * *